United States Patent
Go et al.

(10) Patent No.: US 12,495,410 B2
(45) Date of Patent: Dec. 9, 2025

(54) METHOD AND DEVICE FOR TRANSMITTING AND RECEIVING UPLINK TRANSMISSION BASED ON DEFAULT SPATIAL PARAMETERS IN WIRELESS COMMUNICATION SYSTEM

(71) Applicant: LG ELECTRONICS INC., Seoul (KR)

(72) Inventors: Seongwon Go, Seoul (KR); Hyungtae Kim, Seoul (KR); Jiwon Kang, Seoul (KR); Kyuseok Kim, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 587 days.

(21) Appl. No.: 17/919,083

(22) PCT Filed: Apr. 13, 2021

(86) PCT No.: PCT/KR2021/004631
§ 371 (c)(1),
(2) Date: Oct. 14, 2022

(87) PCT Pub. No.: WO2021/210881
PCT Pub. Date: Oct. 21, 2021

(65) Prior Publication Data
US 2023/0189250 A1    Jun. 15, 2023

Related U.S. Application Data

(60) Provisional application No. 63/029,549, filed on May 24, 2020.

(30) Foreign Application Priority Data

Apr. 17, 2020  (KR) .................. 10-2020-0047036
Oct. 16, 2020  (KR) .................. 10-2020-0134507

(51) Int. Cl.
*H04W 72/1263*    (2023.01)
*H04W 16/28*    (2009.01)
(Continued)

(52) U.S. Cl.
CPC ....... *H04W 72/1263* (2013.01); *H04W 16/28* (2013.01); *H04W 52/146* (2013.01); *H04W 52/242* (2013.01); *H04W 72/23* (2023.01)

(58) Field of Classification Search
CPC ............ H04W 72/1263; H04W 16/28; H04W 52/146; H04W 52/242; H04W 72/23;
(Continued)

(56) References Cited

U.S. PATENT DOCUMENTS

2020/0389885 A1*  12/2020  Tomeba ................ H04W 72/21
2021/0120500 A1*   4/2021  Zhou .................... H04B 17/102
(Continued)

FOREIGN PATENT DOCUMENTS

KR   10-2013-0036383 A    4/2013
KR   10-2019-0039398 A    4/2019
(Continued)

OTHER PUBLICATIONS

R1-2001914, 3GPP TSG RAN WG1 #100b, e-Meeting, Apr. 20-30, 2020, Agenda item: 7.2.6.3., Source: LG Electronics, Title: Remaining issues on multi beam operation, Document for: Discussion and Decision (9 pages).

*Primary Examiner* — Kiet Tang
(74) *Attorney, Agent, or Firm* — BRYAN CAVE LEIGHTON PAISNER LLP

(57) ABSTRACT

Disclosed are a method and device for transmitting and receiving an uplink in a wireless communication system. A method by which a terminal performs uplink transmission in a wireless communication system according to one embodiment of the present disclosure comprises the steps of:
(Continued)

receiving, from a base station, first configuration information related to mapping between one or more uplink reference signals (UL RS) and one or more downlink (DL) RS; receiving, from the base station, second configuration information related to a plurality of spatial parameter candidates for uplink transmission; and performing uplink transmission in N (N≥1) transmission opportunities (TO) on the basis of at least one among N uplink default spatial parameters and N pathloss reference signals (PL RS). The N uplink default spatial parameters are respectively associated with the N TOs. The N PL RSs are respectively associated with the N TOs. The default uplink spatial parameter for a specific TO among the N TOs may be: one spatial parameter, specified by a predefined rule, among the plurality of spatial parameter candidates based on the second configuration information; or a UL RS mapped to the one spatial parameter on the basis of the first configuration information.

14 Claims, 13 Drawing Sheets

(51) Int. Cl.
*H04W 52/14* (2009.01)
*H04W 52/24* (2009.01)
*H04W 72/23* (2023.01)

(58) Field of Classification Search
CPC ..... H04W 52/14; H04W 52/36; H04W 76/15; H04L 5/001; H04L 5/0023; H04L 5/0035; H04L 5/0048; H04L 5/0092; H04L 5/14; H04L 5/0012; H04L 5/0026; H04L 5/0053; H04L 5/0064; H04L 5/0087; H04L 5/0094; H04B 7/0695; H04B 7/088; H04B 7/06
See application file for complete search history.

(56) References Cited

U.S. PATENT DOCUMENTS

2021/0218516 A1\* 7/2021 Chen ................. G01S 5/0018
2021/0219246 A1\* 7/2021 Xu ................... H04W 52/146

FOREIGN PATENT DOCUMENTS

| WO | 2014/107088 A1 | 7/2014 |
| WO | 2020/063541 A1 | 4/2020 |

\* cited by examiner

| R | Serving Cell ID | BWP ID | Oct 1 |
| R | PUCCH Resource ID | | Oct 2 |
| $S_7$ | $S_6$ | $S_5$ | $S_4$ | $S_3$ | $S_2$ | $S_1$ | $S_0$ | Oct 3 |

(b)

| R | Serving Cell ID | BWP ID | Oct 1 |
| R | PUCCH Resource ID | | Oct 2 |
| R | R | Spatial Relation Info ID | Oct 3 |

. . .

| R | PUCCH Resource ID | | Oct 2N-2 |
| R | R | Spatial Relation Info ID | Oct 2N-1 |

FIG.9

| R | Serving Cell ID | | | BWP ID | Oct 1 |
|---|---|---|---|---|---|
| R | R | R | R | SRS Resource Set ID | Oct 2 |
| R | R | Pathloss Reference RS ID | | | Oct 3 |

METHOD AND DEVICE FOR TRANSMITTING AND RECEIVING UPLINK TRANSMISSION BASED ON DEFAULT SPATIAL PARAMETERS IN WIRELESS COMMUNICATION SYSTEM

CROSS-REFERENCE TO RELATED APPLICATIONS

This application is a National Stage Filing Under 35 U.S.C. 371 of International Application No. PCT/KR2021/004631, filed on Apr. 13, 2021, which claims the benefit of earlier filing date and right of priority to Korean Application No. 10-2020-0047036, filed on Apr. 17, 2020, U.S. Provisional Application No. 63/029,549, filed on May 24, 2020, Korean Application No. 10-2020-0134507, filed on Oct. 16, 2020, the contents of which are all hereby incorporated by reference herein in their entirety.

TECHNICAL FIELD

The present disclosure relates to a wireless communication system, and in more detail, relates to a method and an apparatus of transmitting and receiving an uplink in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device of updating a default spatial relation and/or a default pathloss reference signal for uplink transmission and reception in a wireless communication system.

An additional technical problem of the present disclosure is to provide a method and a device of performing uplink transmission and reception based on uplink default spatial relation/pathloss reference signal update in a wireless communication system.

An additional technical problem of the present disclosure is to provide an uplink transmission and reception method and a device based on a default spatial relation/pathloss reference signal for uplink transmission for a single/multi TRP(s)/TO(s) by a single/multi-panel terminal in a wireless communication system.

The technical objects to be achieved by the present disclosure are not limited to the above-described technical objects, and other technical objects which are not described herein will be clearly understood by those skilled in the pertinent art from the following description.

A method of performing uplink transmission by a terminal in a wireless communication system according to an aspect of the present disclosure includes receiving first configuration information related to mapping between one or more uplink reference signals (UL RS) and one or more downlink reference signals (DL RS) from a base station; receiving second configuration information related to a plurality of spatial parameter candidates for uplink transmission from the base station; and performing uplink transmission at N transmission occasions (TO) based on one or more of N (N is an integer exceeding 1) uplink default spatial parameters or N pathloss reference signals (PL RS), and the N default uplink spatial parameters may be associated with the N TOs respectively, the N PL RSs may be associated with the N TOs respectively and a default uplink spatial parameter for a specific TO among the N TOs may be one spatial parameter specified by a predefined rule among the plurality of spatial parameter candidates based on the second configuration information, or an UL RS mapped to the one spatial parameter based on the first configuration information.

A method of performing uplink reception by a base station in a wireless communication system according to an additional aspect of the present disclosure includes transmitting to a terminal first configuration information related to mapping between one or more uplink reference signals (UL RS) and one or more downlink reference signals (DL RS); transmitting to the terminal second configuration information related to a plurality of spatial parameter candidates for uplink transmission; and receiving uplink transmission transmitted by the terminal at N transmission occasions (TO) based on one or more of N (N is an integer exceeding 1) uplink default spatial parameters or N pathloss reference signals (PL RS), and the N default uplink spatial parameters may be associated with the N TOs respectively, the N PL RSs may be associated with the N TOs respectively and a default uplink spatial parameter for a specific TO among the N TOs may be one spatial parameter specified by a predefined rule among the plurality of spatial parameter candidates based on the second configuration information, or an UL RS mapped to the one spatial parameter based on the first configuration information.

According to the present disclosure, a method and a device of updating a default spatial relation and/or a default pathloss reference signal for uplink transmission and reception in a wireless communication system may be provided.

According to the present disclosure, a method and a device of performing uplink transmission and reception based on uplink default spatial relation/pathloss reference signal update in a wireless communication system may be provided.

An additional technical problem of the present disclosure is to provide an uplink transmission and reception method and a device based on a default spatial relation/pathloss reference signal for uplink transmission for a single/multi TRP(s)/TO(s) by a single/multi-panel terminal in a wireless communication system.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 8 is a diagram illustrating a PUCCH spatial relation activation/deactivation MAC CE in a wireless communication system to which the present disclosure may be applied.

FIG. 9 is a diagram illustrating an SRS path loss reference RS activation/deactivation MAC CE in a wireless communication system to which the present disclosure may be applied.

DETAILED DESCRIPTION

Figure 1:
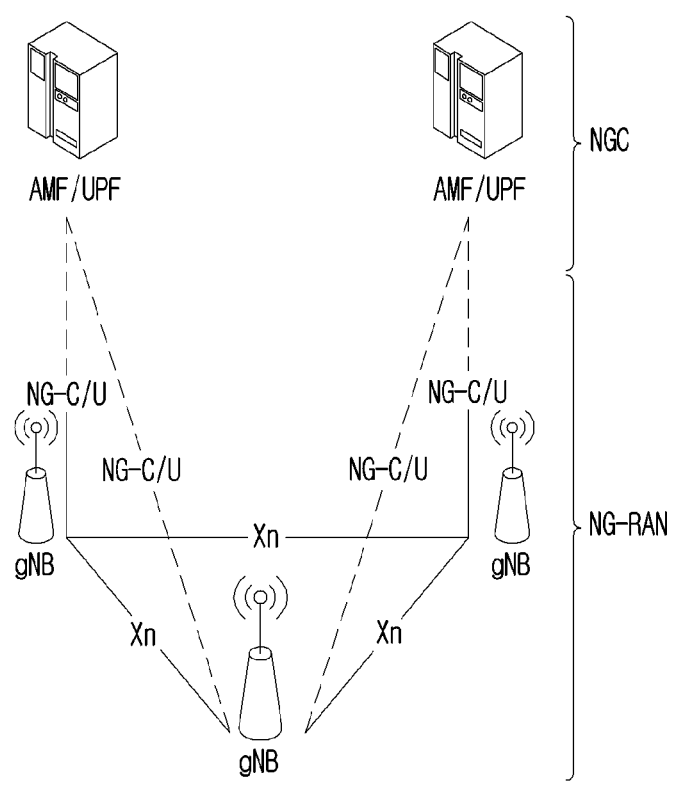
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.
- BM: beam management
- CQI: Channel Quality Indicator
- CRI: channel state information—reference signal resource indicator
- CSI: channel state information
- CSI-IM: channel state information—interference measurement
- CSI-RS: channel state information—reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
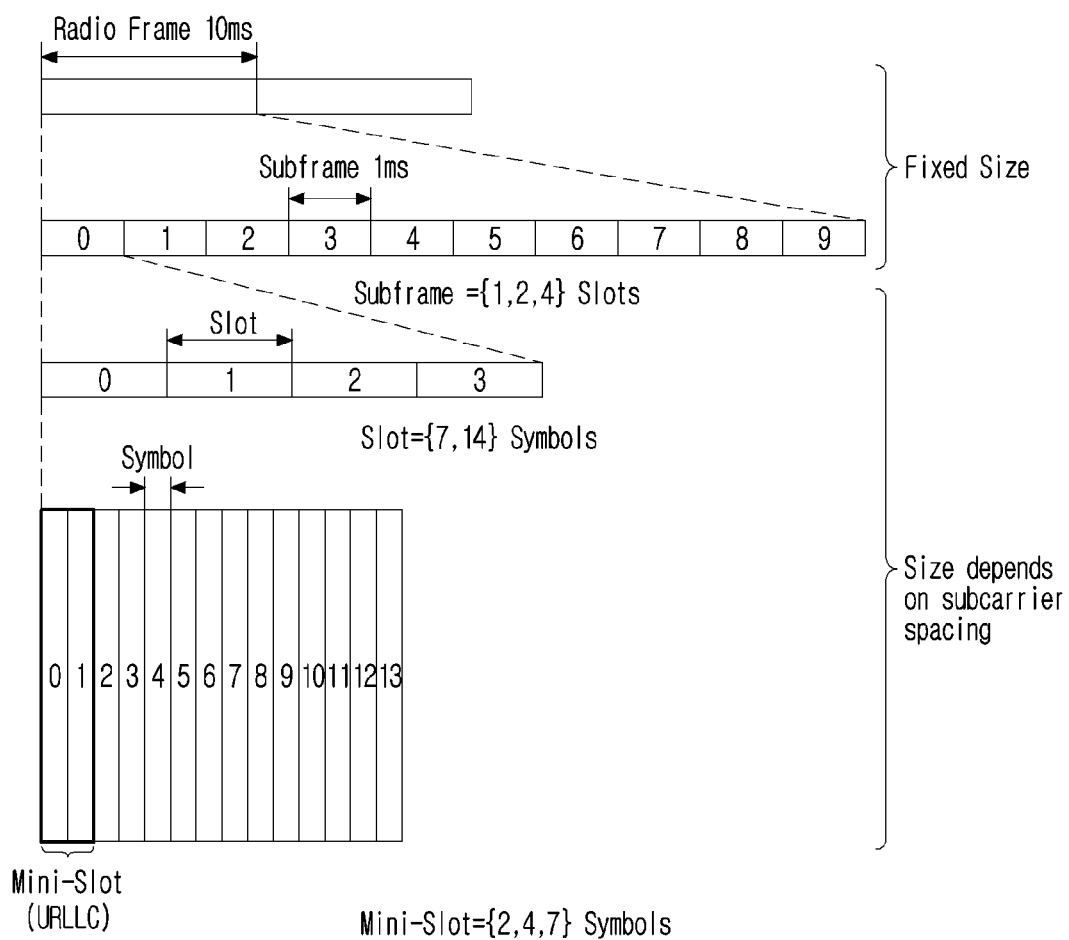
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration µ, slots are numbered in an increasing order of $n_s^\mu \in \{0, \ldots, N_{slot}^{subframe,\mu} - 1\}$ in a subframe and are numbered in an increasing order of $n_{s,f}^\mu \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symbs}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{subframe,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| µ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on µ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
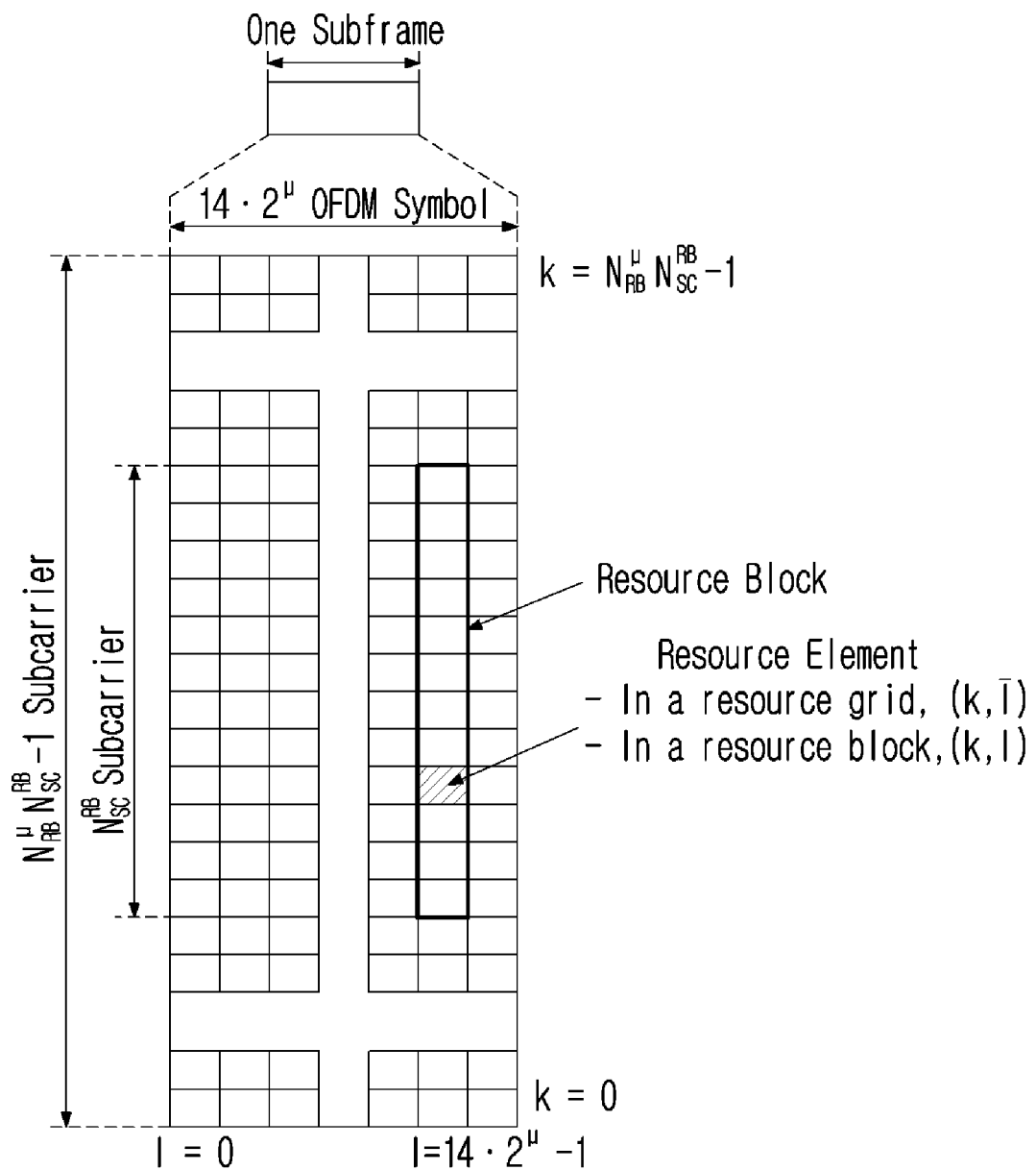
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per µ and antenna port p. Each element of a resource grid for μ and an antenna port p is referred to as a resource element and is uniquely identified by an index pair (k,l'). Here, k=0, . . . , $N_{RB}^{\mu}N_{sc}^{RB}-1$ is an index in a frequency domain and l'=0, . . . , $2^{\mu}N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for p and an antenna port p corresponds to a complex value, $a_{k,l'}^{(p,\mu)}$. When there is no risk of confusion or when a specific antenna port or numerology is not specified, indexes p and p may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
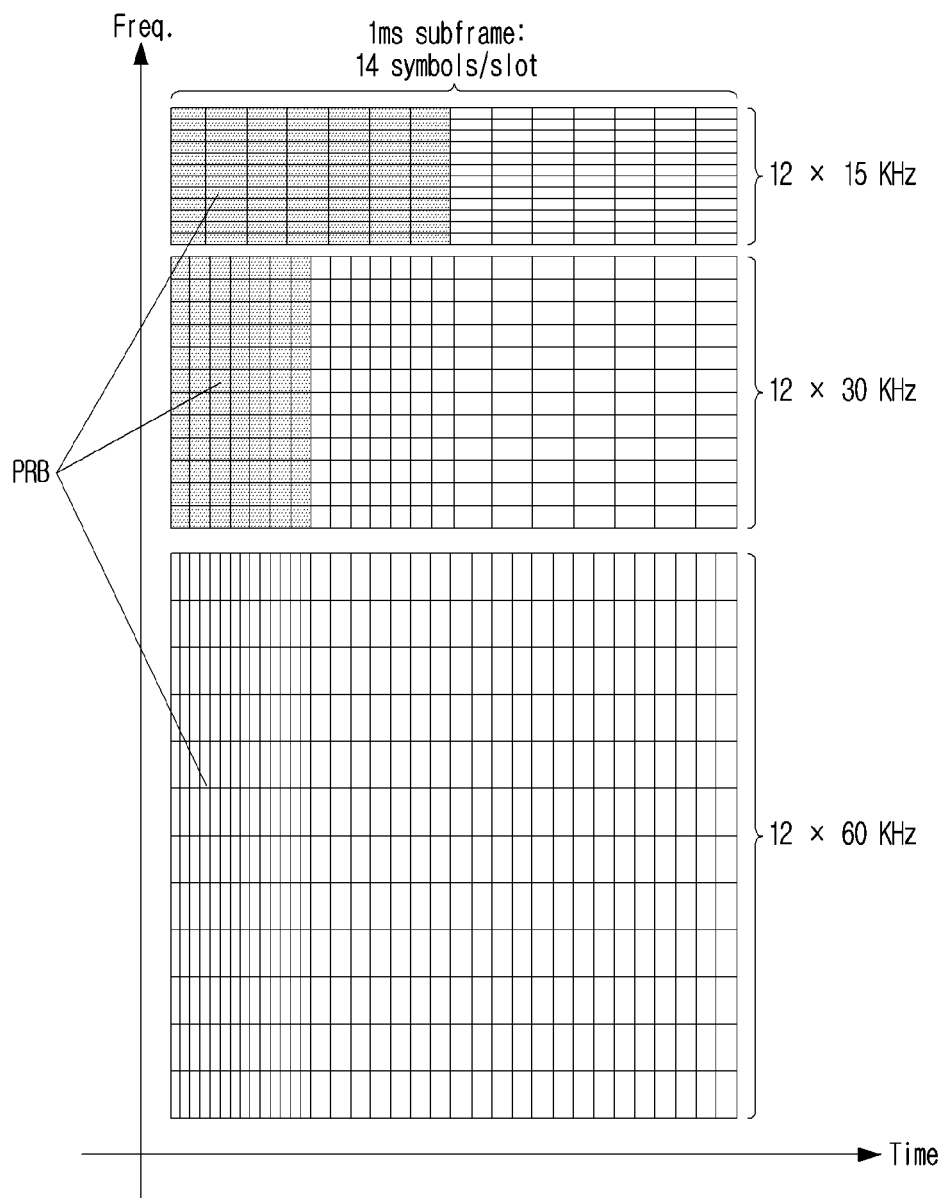
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
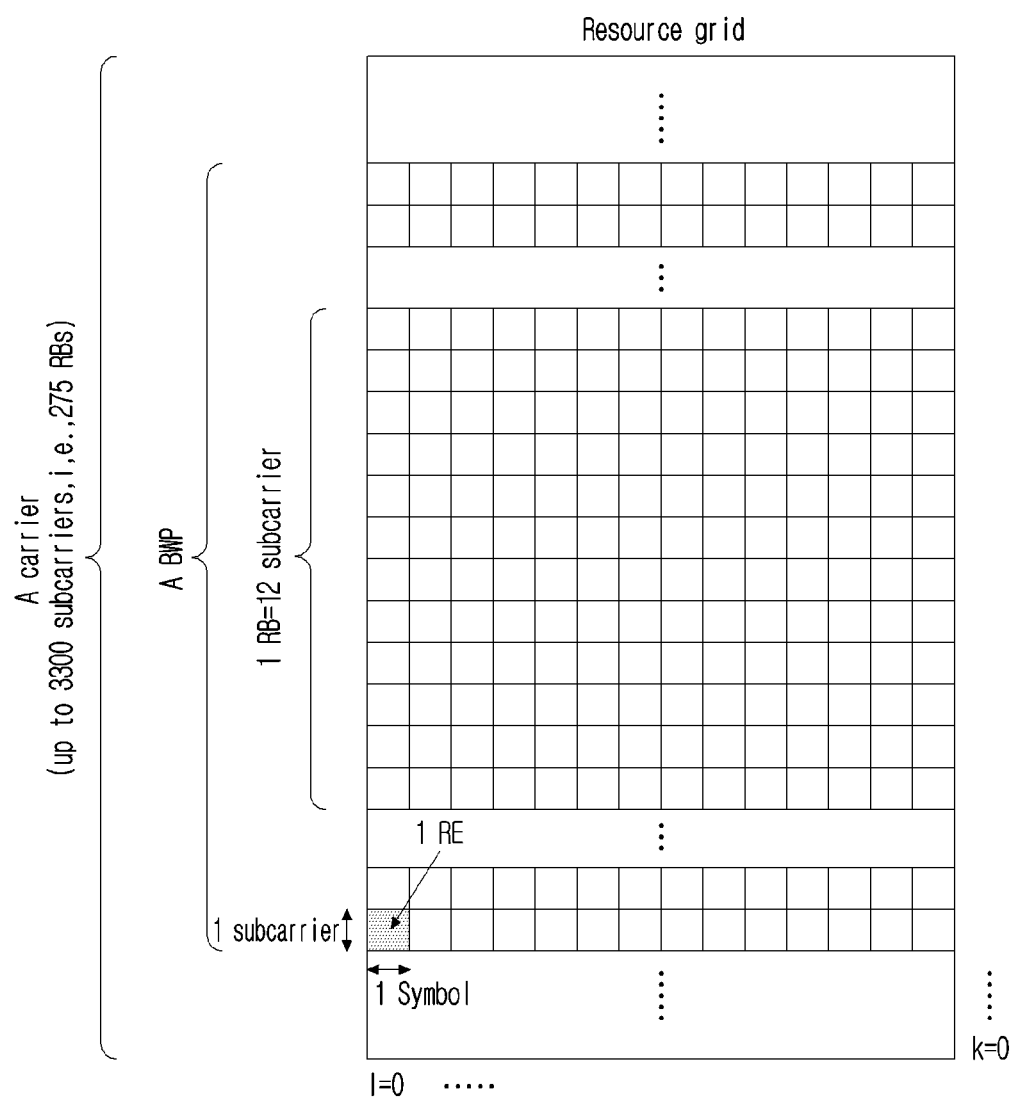
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a sub-carrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing.

Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
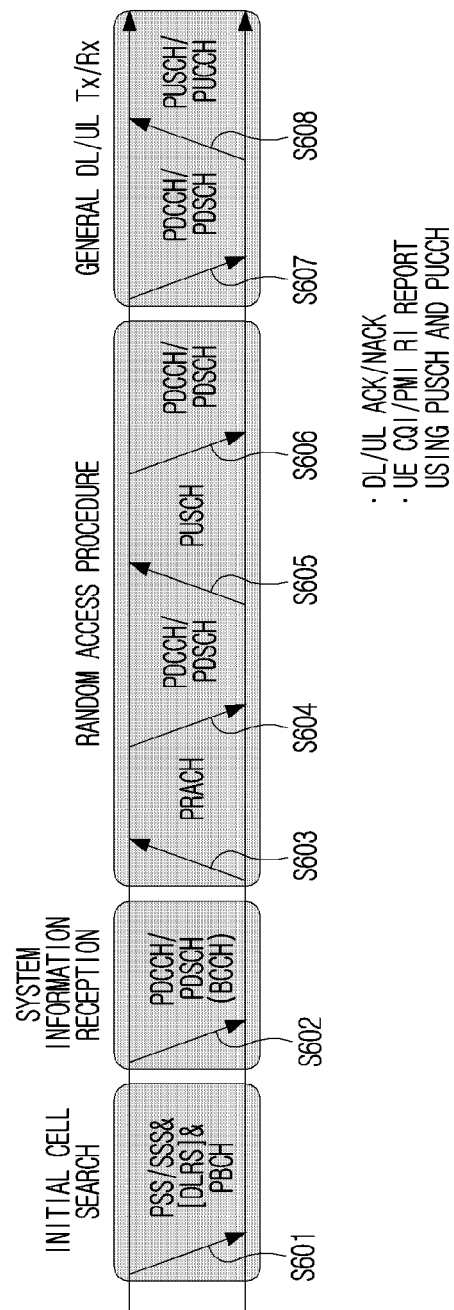
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/

PRACH/SRS resources) are separated and managed/controlled per each TRP/panel in a unit of a corresponding CORESET group (i.e., per TRP/panel belonging to the same CORESET group).

Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
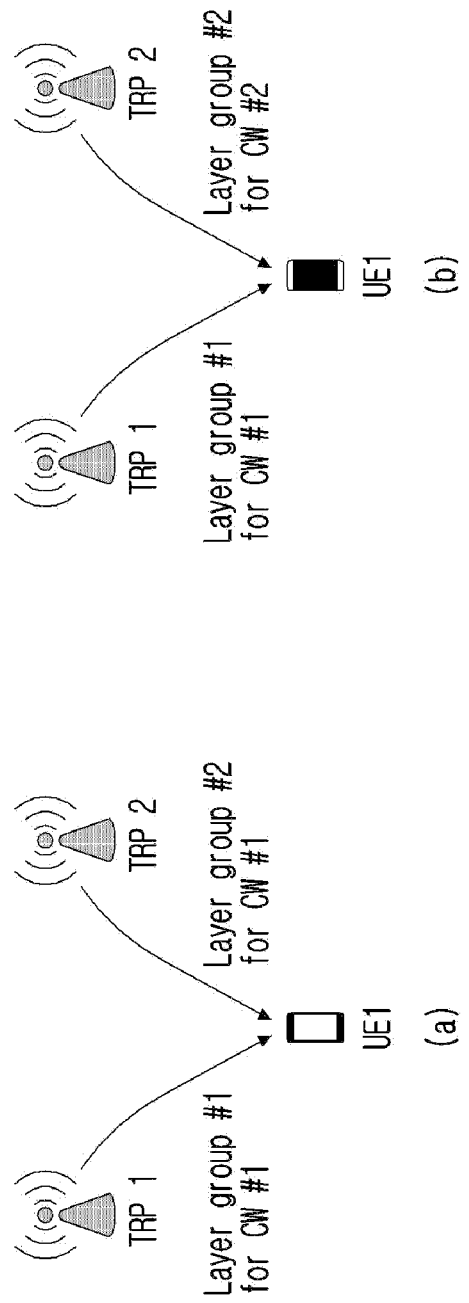
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7($a$), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7($b$), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7($b$), it may have a disadvantage that a code rate corresponding to a TB is higher compared to FIG. 7($a$). However, it has an advantage that it may adjust a code rate by indicating a different RV (redundancy version) value or may adjust a modulation order of each CW for encoded bits generated from the same TB according to a channel environment.

According to methods illustrated in FIG. 7($a$) and FIG. 7($b$) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and Frequency Resource Allocation is Overlapped and n (n<=Ns) TCI States in a Single Slot 1-a) Method 1a
  The same TB is transmitted in one layer or layer set at each transmission time (occasion) and each layer or each layer set is associated with one TCI and one set of DMRS port(s).
  A single codeword having one RV is used in all spatial layers or all layer sets. With regard to UE, different coded bits are mapped to a different layer or layer set by using the same mapping rule.

1-b) Method 1b
  The same TB is transmitted in one layer or layer set at each transmission time (occasion) and each layer or each layer set is associated with one TCI and one set of DMRS port(s).
  A single codeword having one RV is used in each spatial layer or each layer set. RV(s) corresponding to each spatial layer or each layer set may be the same or different.

1-c) Method 1c
  At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency Resource Allocation is not Overlapped and n (n<=$N_f$) TCI States in a Single Slot
  Each non-overlapping frequency resource allocation is associated with one TCI state.
  The same single/multiple DMRS port(s) are associated with all non-overlapping frequency resource allocation.

2-a) Method 2a
  A single codeword having one RV is used for all resource allocation. With regard to UE, common RB matching (mapping of a codeword to a layer) is applied to all resource allocation.

2-b) Method 2b
  A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time Resource Allocation is not Overlapped and n (n<=Nt1) TCI States in a Single Slot
  Each transmission time (occasion) of a TB has time granularity of a mini-slot and has one TCI and one RV.
  A common MCS is used with a single or multiple DMRS port(s) at every transmission time (occasion) in a slot.
  A RV/TCI may be the same or different at a different transmission time (occasion).

4) Method 4 (TDM): N (n<=Nt2) TCI States in K (n<=K) Different Slots
  Each transmission time (occasion) of a TB has one TCI and one RV.
  Every transmission time (occasion) across K slots uses a common MCS with a single or multiple DMRS port(s).

A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a time domain resource assignment (TDRA) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

A proposal of the present disclosure may be extended and applied to both a case in which various uplink/downlink channels are repetitively transmitted to a different time/frequency/space resource and a case in which various uplink/downlink channels are partitively transmitted to a different time/frequency/space resource.

Uplink Power Control

In a wireless communication system, it may be necessary to increase or decrease transmission power of a terminal (e.g., User Equipment, UE) and/or a mobile device according to circumstances. In this way, controlling the transmission power of a terminal and/or a mobile device may be referred to as uplink power control. As an example, a transmission power control method may be applied to satisfy a requirement (e.g., Signal-to-Noise Ratio (SNR), Bit Error Ratio (BER), Block Error Ratio (BLER)) etc.) of a base station (e.g., gNB, eNB, etc.).

Power control as described above may be performed in an open-loop power control scheme and a closed-loop power control scheme.

Specifically, an open-loop power control method means a method of controlling transmission power without feedback from a transmitting device (e.g., a base station, etc.) to a receiving device (e.g., a terminal, etc.) and/or feedback from a receiving device to a transmitting device. For example, a terminal may receive a specific channel/signal from a base station, and may estimate strength of the received power using that. Thereafter, a terminal may control transmission power using the estimated strength of the received power.

In contrast, a closed-loop power control method means a method of controlling transmission power based on feedback from a transmitting device to a receiving device and/or feedback from a receiving device to a transmitting device. For example, a base station receives a specific channel/signal from a terminal, and determines an optimal power level of a terminal based on the power level, SNR, BER, BLER, etc. measured by the received specific channel/signal. A base station transmits information (i.e., feedback) on the determined optimal power level to a terminal through a control channel, etc., and a terminal may control transmission power using the feedback provided by a base station.

Hereinafter, for convenience of description, a power control method will be described based on a case in which a terminal performs PUSCH transmission. The method may be extended and applied to other uplink data channels supported in a wireless communication system.

In the case of PUSCH transmission in an active uplink bandwidth part (UL BWP) of a carrier (f) of a serving cell (c), a terminal may calculate a linear power value of transmission power determined by Equation 3 below. Thereafter, the corresponding terminal may control the transmission power by taking the calculated linear power value into consideration, such as the number of antenna ports and/or the number of SRS ports.

Specifically, by using a parameter set configuration based on index j and a PUSCH power control adjustment state based on index 1, when a terminal performs PUSCH transmission in an activated UL BWP (b) of a carrier (f) of a serving cell (c), the terminal may determine PUSCH transmission power $P_{PUSCH,b,f,c}(i, j, q_d, 1)$ (dBm) at a PUSCH transmission occasion (i) based on Equation 3 below.

In this case, a transmission occasion (i.e., a transmission time unit) (i) may be defined by a slot index (n_s) in a frame of a system frame number (SFN), a first symbol (S) in a slot, the number (L) of consecutive symbols, etc.

{ 수학식 3 }

$$P_{PUSCH,b,f,c}(i, j, q_d, l) = \min \begin{Bmatrix} P_{CMAX,f,c}(i), \\ P_{0\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$

In Equation 3, index j represents an index for an open-loop power control parameter (e.g., Po, a (alpha), etc.), and a maximum of 32 parameter sets per cell may be configured. Index q_d represents an index of a DL RS resource for a path loss (PL) measurement (e.g., $PL_{b,f,c}(q_d)$), and up to four measurements may be configured per cell. Index l represents an index for a closed-loop power control process, and a maximum of two processes per cell may be configured.

Specifically, $P_O$ (e.g., $P_{O\_PUSCH,b,f,c}(j)$) is a parameter broadcast as part of system information, and may indicate a target reception power at a receiving side. The corresponding $P_0$ value may be configured in consideration of throughput of a terminal, capacity of a cell, noise and/or interference, etc. In addition, alpha (e.g., $\alpha_{b,f,c}(j)$) may represent a rate at which compensation for path loss is performed. Alpha may be configured to a value from 0 to 1, and full pathloss compensation or fractional pathloss compensation may be performed according to the set value. In this case, the alpha value may be configured in consideration of interference between terminals and/or data rate. In addition, $P_{CMAX,f,c}(i)$ may represent a configured UE transmit power. For example, the configured terminal transmission power may be interpreted as 'configured maximum UE output power' defined in 3GPP TS 38.101-1 and/or TS 38.101-2. In addition, $M_{RB,b,f,c}^{PUSCH}(i)$ may represent a bandwidth of PUSCH resource allocation expressed by the number of resource blocks (RBs) for a PUSCH transmission occasion based on subcarrier spacing (μ). In addition, $f_{b,f,c}(i,l)$ related to a PUSCH power control adjustment state may be configured or indicated based on a TPC command field of DCI (e.g., DCI format 0_0, DCI format 0_1, DCI format 2_2, DCI format2_3, etc.).

In this case, a specific RRC (Radio Resource Control) parameter (e.g., SRI-PUSCHPowerControl-Mapping, etc.) may represent a linkage between an SRI (SRS Resource Indicator) field of DCI (downlink control information) and the above-mentioned indexes j, q_d, l. In other words, the aforementioned indexes j, l, q_d, etc. may be associated with a beam, a panel, and/or a spatial domain transmission filter, etc. based on specific information. Through this, PUSCH transmission power control in units of beams, panels, and/or spatial domain transmission filters may be performed.

The above-described parameters and/or information for PUSCH power control may be individually (i.e., independently) configured for each BWP. In this case, corresponding parameters and/or information may be configured or indicated through higher layer signaling (e.g., RRC signaling, Medium Access Control-Control Element (MAC-CE), etc.) and/or DCI. As an example, parameters and/or information for PUSCH power control may be transmitted through RRC signaling PUSCH-ConfigCommon, PUSCH-PowerControl, etc., and PUSCH-ConfigCommon and PUSCH-PowerControl may be configured as shown in Table 6 below.

beam which will be used when transmitting an UL channel. A base station may indicate which UL transmission beam will be used when transmitting a PUCCH and an SRS by configuring a DL reference signal (e.g., an SSB-RI (SB Resource Indicator), a CRI (CSI-RS Resource Indicator) (P/SP/AP: periodic/semi-persistent/aperiodic)) or an SRS (i.e., an SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through an SRI field and used as a PUSCH transmission beam of a terminal.

Hereinafter, a SRS for a codebook (CB) and a non-codebook (NCB) will be described.

First, for a CB UL, a base station may first configure and/or indicate transmission of an SRS resource set for 'a CB' to a terminal. In addition, a terminal may transmit any n port SRS resource in a corresponding SRS resource set. A base station may receive a UL channel based on corresponding SRS transmission and use it for PUSCH scheduling of a terminal. Subsequently, a base station may indicate a PUSCH (transmission) beam of a terminal by indicating a SRS resource for 'a CB' which is previously transmitted by a terminal through a SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

TABLE 6

| | |
|---|---|
| PUSCH-ConfigCommon ::= | SEQUENCE { |
|    groupHoppingEnabledTransformPrecoding | ENUMERATED {enabled} |
|    pusch-TimeDomainAllocationList | PUSCH-TimeDomainResourceAllocationList |
|    msg3-DeltaPreamble | INTEGER (−1..6) |
|    p0-NominalWithGrant | INTEGER (−202..24) |
|    ... | |
| } | |
| PUSCH-PowerControl ::= | SEQUENCE { |
|    tpc-Accumulation | ENUMERATED { disabled } |
|    msg3-Alpha | Alpha |
|    p0-NominalWithoutGrant | INTEGER (−202..24) |
|    p0-AlphaSets | SEQUENCE (SIZE (1..maxNrofP0-PUSCH-AlphaSets)) OF P0-PUSCH-AlphaSet |
|    pathlossReferenceRSToAddModList OF PUSCH-PathlossReferenceRS | SEQUENCE (SIZE (1..maxNrofPUSCH-PathlossReferenceRSs)) |
|    pathlossReferenceRSToReleaseList PathlossReferenceRSs)) OF PUSCH-PathlossReferenceRS-Id | SEQUENCE (SIZE (1..maxNrofPUSCH- |
|    twoPUSCH-PC-Adjustment States | ENUMERATED {twoStates} |
|    deltaMCS | ENUMERATED {enabled} |
|    sri-PUSCH-MappingToAddModList PUSCH-PowerControl | SEQUENCE (SIZE (1..maxNrofSRI-PUSCH-Mappings) ) OF SRI- |
|    sri-PUSCH-MappingToReleaseList PUSCH-PowerControlId | SEQUENCE (SIZE (1..maxNrofSRI-PUSCH-Mappings) ) OF SRI- |
| } | |

Through the method as described above, a terminal may determine or calculate PUSCH transmission power, and may transmit a PUSCH using the determined or calculated PUSCH transmission power.

The above-described example is about uplink power control for a PUSCH and power control for a PUCCH, a SRS and a PRACH may be performed by a method which is not the same as, but similar to it.

Sounding Reference Signal (SRS)

In Rel-15 NR, spatialRelationInfo may be used in order for a base station to indicate to a terminal a transmission Next, for a NCB UL, a base station may first configure and/or indicate transmission of an SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS associated with a corresponding SRS resource set. Subsequently, a base station may indicate a PUSCH (transmission) beam of a terminal and an UL rank and an UL precoder at the same time by indicating part of SRS resources for 'a non-CB' which are previously transmitted by a terminal through an SRI field of DCI when performing PUSCH scheduling through UL DCI. Thereby, a terminal may perform PUSCH transmission according to a corresponding indication.

Hereinafter, an SRS for beam management will be described.

An SRS may be used for beam management. Specifically, UL BM may be performed by beamformed UL SRS transmission. Whether UL BM of an SRS resource set is applied is configured by (a higher layer parameter) 'usage'. When usage is configured as 'BeamManagement (BM)', only one SRS resource may be transmitted to each of a plurality of SRS resource sets in a given time instant. A terminal may be configured with one or more Sounding Reference Symbol (SRS) resource sets configured by (a higher layer parameter) 'SRS-ResourceSet' (through higher layer signaling, e.g., RRC signaling, etc.). For each SRS resource set, UE may be configured with K≥1 SRS resources (a higher layer parameter, 'SRS-resource'). Here, K is a natural number and the maximum value of K is indicated by SRS_capability.

Hereinafter, an SRS for antenna switching will be described.

An SRS may be used for acquisition of DL CSI (Channel State Information) information (e.g., DL CSI acquisition). In a specific example, a BS (Base station) may measure an SRS from UE after scheduling transmission of an SRS to UE (User Equipment) under a situation of a single cell or in multi cells (e.g., carrier aggregation (CA)) based on TDD. In this case, a base station may perform scheduling of a DL signal/channel to UE based on measurement by an SRS by assuming DL/UL reciprocity. Here, regarding SRS-based DL CSI acquisition, an SRS may be configured for antenna switching.

In an example, when following standards (e.g., 3gpp TS38.214), usage of an SRS may be configured to a base station and/or a terminal by using a higher layer parameter (e.g., usage of a RRC parameter, SRS-ResourceSet). Here, usage of a SRS may be configured as usage of beam management, usage of codebook transmission, usage of non-codebook transmission, usage of antenna switching, etc.

Path Loss (PL) Reference Signal (RS) Update Method

In NR MIMO Rel-15, in an uplink (UL channel)/RS (e.g., PUSCH, PUCCH, SRS) of a terminal, a base station may configure a DL RS (i.e., pathloss reference RS, or pathloss RS or PL RS in short) by using an open loop power control parameter for pathloss compensation. In addition, only for a PUCCH, the pathloss RS may be updated by updating a PUCCH spatial relation information identifier (PUCCH-SpatialRelationInfoId) through a MAC control element (CE) message for each PUCCH resource.

Hereinafter, a PUCCH spatial relation activation/deactivation MAC CE will be described in detail.

FIG. 8 is a diagram illustrating a PUCCH spatial relation activation/deactivation MAC CE in a wireless communication system to which the present disclosure may be applied.

Referring to FIG. 8(a), a PUCCH spatial relation Activation/Deactivation MAC CE is identified by a MAC subheader with a logical channel identifier (LCID). In addition, a PUCCH spatial relation Activation/Deactivation MAC CE has a fixed size of 24 bits with following fields.

Serving Cell identity (ID): This field indicates an identity of a serving cell for which the corresponding MAC CE applies. A length of this field is 5 bits;

BWP identity (ID): This field indicates a UL BWP for which the corresponding MAC CE applies as a codepoint of a DCI bandwidth part indicator field. A length of the BWP ID field is 2 bits;

PUCCH Resource identifier (ID): This field includes an identifier of a PUCCH resource ID identified by PUCCH-ResourceId. A length of this field is 7 bits;

Si: If there is a PUCCH Spatial Relation Info with PUCCH-SpatialRelationInfoId, configured for an uplink BWP indicated by BWP ID field, Si indicates an activation status of PUCCH Spatial Relation Info with PUCCH-SpatialRelationInfoId equal to i+1, otherwise MAC entity ignores this field. The Si field is set to 1 to indicate that PUCCH Spatial Relation Info with PUCCH-SpatialRelationInfoId equal to i+1 is activated. The Si field is set to 0 to indicate that PUCCH Spatial Relation Info with PUCCH-SpatialRelationInfoId equal to i+1 is deactivated. Only a single PUCCH Spatial Relation Info can be active for a PUCCH Resource at a time;

R: Reserved bit, set to 0.

FIG. 8(b) is a diagram illustrating an enhanced PUCCH spatial relation activation/deactivation MAC CE in a wireless communication system to which the present disclosure may be applied.

Referring to FIG. 8(b), an enhanced PUCCH spatial relation Activation/Deactivation MAC CE is identified by a MAC subheader with an enhanced (eLCID). In addition, an enhanced PUCCH spatial relation Activation/Deactivation MAC CE has a variable size with following fields.

Serving Cell identity (ID): This field indicates an identity of a serving cell for which the corresponding MAC CE applies. A length of this field is 5 bits;

BWP identity (ID): This field indicates a UL BWP for which the corresponding MAC CE applies as a codepoint of a DCI bandwidth part indicator field. A length of the BWP ID field is 2 bits;

PUCCH Resource identifier (ID): This field includes an identifier of a PUCCH resource ID identified by PUCCH-ResourceId to be activated with a spatial relation indicated by Spatial relation Info ID field in a subsequent octet. A length of this field is 7 bits. If the indicated PUCCH resource is configured as a part of a PUCCH group, and other PUCCH resources in the same PUCCH group are not indicated in the corresponding MAC CE, this MAC CE is applied to all PUCCH resources in the corresponding PUCCH group;

Spatial Relation Info identifier (ID): This field includes PUCCH-SpatialRelationInfoId-1, where PUCCH-SpatialRelationInfoId is an identifier of PUCCH spatial relationship information in PUCCH Resource ID configured in PUCCH-Config. A length of this field is 6 bits;

R: Reserved bit, set to 0.

After that, in Rel-16 eNR MIMO, standardization was performed to update a pathloss RS for a PUSCH and a SRS through individual MAC CE messages. In addition, standardization was progressed to increase the number of pathloss RS pools configurable by RRC signaling from 8 to 64. This will be described in detail.

i) Pathloss reference RS for PUSCH can be activated/updated via a MAC CE.

The MAC CE message can activate/update the value of PUSCH-PathlossReferenceRS-Id corresponding to sri-PUSCH-PowerControlId.

In TS38.331, the mapping is given by SRI-PUSCH-PowerControl, in which the linkage is between sri-PUSCH-PowerControlId and PUSCH-PathlossReferenceRS-Id.

Reuse higher layer filtered RSRP for pathloss measurement, with defining the applicable timing after the MAC CE.

Filtered RSRP value for previous pathloss RS will be used before the application time (the next slot which is 2 ms after the Nth measurement sample), where the 1st measurement sample corresponds to be the 1st instance (i.e., 3 ms after sending ACK for the MAC CE).

This is only applicable for UEs supporting the number of RRC-configurable pathloss RSs larger than 4, and this is only for the case that the activated PL RS by the MAC CE is not tracked.

A UE is only required to track the activated PL RS(s) if the number of the configured PL RSs by RRC is greater than 4.

It is up to an implementation of UE whether to update the filtered RSRP value for previous PL RS 3 ms after sending ACK for the MAC CE.

Here, a value of N may be determined by considering terminal characteristics and for example, a fixed value of N=5 may be applied.

ii) Pathloss reference RS for aperiodic (AP)-SRS/semi-persistent (SP)-SRS can be activated/updated via a MAC CE.

A UE can be configured with multiple pathloss RSs by RRC and one of them can be activated/updated via the MAC CE for an SRS resource set.

Reuse higher layer filtered RSRP for pathloss measurement, with defining the applicable timing after the MAC CE.

Filtered RSRP value for previous pathloss RS will be used before the application time (the next slot which is 2 ms after the Nth measurement sample), where the 1st measurement sample corresponds to be the 1st instance (i.e., 3 ms after sending ACK for the MAC CE).

This is only applicable for UEs supporting the number of RRC-configurable pathloss RSs larger than 4, and this is only for the case that the activated PL RS by the MAC CE is not tracked.

A UE is only required to track the activated PL RS if the configured PL RSs by RRC is greater than 4.

It is up to an implementation of a UE whether to update the filtered RSRP value for previous PL RS 3 ms after sending ACK for the MAC CE.

Here, a value of N may be determined by considering terminal characteristics and for example, a fixed value of N=5 may be applied.

iii) On power control for a PUSCH, a PUCCH, and an SRS, the total number of maximum configurable pathloss RSs by RRC is 64.

Such pathloss reference signals are for configuration purpose only, and a UE is still only required to track up to 4 pathloss RSs for any PUSCH, PUCCH, and SRS transmissions.

Here, "up to 4 pathloss RSs" applies the total number of pathloss RSs for a PUSCH, a PUCCH, and an SRS.

iv) For an update of a pathloss RS for a PUSCH/SRS based on a MAC CE, a new RRC parameter enablePLRSupdateForPUSCHSRS is introduced to enable MAC CE based pathloss RS update for a PUSCH/SRS.

v) Followings are for a case of RRC parameter enablePLRSupdateForPUSCHSRS being configured:

If a grant-based or grant-free PUSCH transmission is scheduled/activated by DCI format 0_1 that does not include a SRI field, the RS resource index qd corresponding to the PUSCH-PathlossReferenceRS-Id mapped with sri-PUSCH-PowerControlId=0 is used for path-loss measurement of a PUSCH. In this case, a UE expects to be configured with sri-PUSCH-PowerControl.

vi) A application timing for newly activated PL RS(s) is the next slot which is 2 ms after a N-th measurement sample and here, a first measurement sample is a first instance, i.e., 3 ms after ACK transmission for a MAC CE.

Here, a value of N may be determined by considering terminal characteristics and for example, a fixed value of N=5 may be applied.

The application timing may be applied to a PUSCH, a AP/SP-SRS and a PUCCH.

vii) When the number of PL RSs which are RRC-configured for pathloss estimation for a PUCCH, a PUSCH and a SRS exceeds 4, UE is not required to track RS(s) which are not activated by a MAC-CE.

With this regard, a configuration according to whether a default PL RS is enabled may be required.

Accordingly, when MAC-CE based PL RS activation/update is not enabled, UE may not expect that more than 4 PL RSs will be configured.

viii) When a default PL RS is applied, UE may expect that a periodic RS will be configured as a QCL-TypeD RS for a default pathloss RS.

Hereinafter, a default pathloss reference RS for a PUSCH/a SRS is described.

i) When a PL RS for a SRS is not configured, an operation may be performed as follows.

When a CORESET is not configured and at least one activated TCI state is configured for a PDSCH, a PL RS for a SRS may be a QCL-TypeD RS of an activated TCI state of the lowest ID for a PDSCH. Here, a PL RS may be a periodic RS.

When a CORESET is not configured and there is no activated TCI state on a CC for a PDSCH, the existing operation may be followed.

ii) For UE supporting a characteristic of a default spatial relation for a dedicated-PUSCH, a default pathloss RS and a default spatial relation of a PUSCH scheduled by DCI format 0_0 may be supported when there is no PUCCH resource configured on an UL BWP CC activated in FR2.

A default spatial relation may be a TCI state/QCL assumption of a CORESET having the lowest ID.

A default pathloss RS may be the same QCL-TypeD RS as a TCI state/QCL assumption of a CORESET having the lowest ID. Here, a PL RS may be a periodic RS.

iii) When PUCCH resource(s) are a configured RRC-connected mode and any spatial relation is not configured for all configured PUCCH resource(s) in supporting PUSCH scheduling by DCI format 0_0 on a CC in FR2, a spatial relation and a PL RS for a PUSCH scheduled by DCI format 0_0 may follow a default spatial relation and a default pathloss RS for the PUCCH resource(s), respectively.

iv) In order to enable an UE operation for a default spatial relation and pathloss RS, a RRC parameter for enabling a default spatial relation and PL RS operation such as a enableDefaultBeamPlForPUSCH0 parameter for a PUSCH scheduled by DCI format 0_0, a enableDefaultBeamPlForPUCCH parameter for a dedicated PUCCH and a enableDefaultBeamPlForSRS parameter for a dedicated SRS may be introduced.

Hereinafter, an SRS Pathloss Reference RS Activation/Deactivation MAC CE (or SRS Pathloss Reference RS Update MAC CE) will be specifically described.

FIG. 9 is a diagram illustrating an SRS path loss reference RS activation/deactivation MAC CE in a wireless communication system to which the present disclosure may be applied.

Referring to FIG. 9, an SRS Pathloss Reference RS Activation/Deactivation MAC CE is identified by a MAC subheader with LCID. An SRS Pathloss Reference RS Activation/Deactivation MAC CE has a fixed size with 24 bits:

Serving Cell identity (ID): This field indicates an identity of a serving cell, which includes an activated SRS resource set. A length of this field is 5 bits;

BWP identity (ID): This field indicates a UL BWP as a codepoint of a DCI bandwidth part indicator field, which includes an activated SRS resource set. A length of BWP ID field is 2 bits;

SRS Resource Set identifier (ID): This field indicates an SRS Resource Set ID identified by SRS-ResourceSetId. A length of this field is 4 bits;

Pathloss reference RS identifier (ID): This field indicates an SRS Resource Set ID identified by pathlossReferenceRS. A length of this field is 6 bits;

R: Reserved bit, set to 0.

Hereinafter, a PUSCH pathloss reference RS activation/deactivation MAC CE (or PUSCH pathloss reference RS update MAC CE) will be described in detail.

Figure 10:
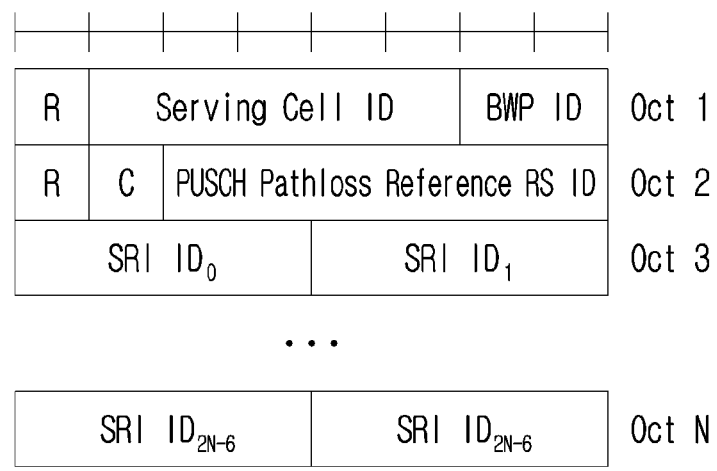
FIG. 10 is a diagram illustrating a PUSCH path loss reference RS activation/deactivation MAC CE in a wireless communication system to which the present disclosure may be applied.

FIG. 10 is a diagram illustrating a PUSCH path loss reference RS activation/deactivation MAC CE in a wireless communication system to which the present disclosure may be applied.

Referring to FIG. 10, a PUSCH Pathloss Reference RS Activation/Deactivation MAC CE is identified by a MAC subheader with an eLCID. In addition, a PUSCH Pathloss Reference RS Activation/Deactivation MAC CE has a variable size with the following fields:

Serving Cell identity (ID): This field indicates an identity of a serving cell, which includes an activated PUSCH pathloss reference RS. A length of this field is 5 bits;

BWP identifier (BWP ID): This field indicates a UL BWP including an activated PUSCH pathloss reference RS as a codepoint of a DCI bandwidth part indicator field. A length of the BWP ID field is 2 bits;

PUSCH Pathloss Reference RS identifier (ID): This field indicates a PUSCH pathloss reference RS identified by PUSCH-PathlossReferenceRS-Id, and this PUSCH path loss reference RS is updated in SRI PUSCH power control mappings indicated by an SRI ID field indicated in the same MAC CE. A length of this field is 6 bits;

C: This field indicates the presence of an additional SRI ID in the last octet of this MAC CE. If this field is set to 1, two SRI ID(s) are present in the last octet. Otherwise, only one SRI ID (i.e., the first SRI ID) is present in the last octet;

SRI (SRS resource indicator) identifier (SRI ID): This field indicates an SRI PUSCH power control identifier (ID) identified by sri-PUSCH-PowerControlId. A length of this field is 4 bits;

R: Reserved bit, set to 0.

In addition, in order to reduce an overhead in an UL beam configuration/indication of a terminal, for a transmission beam (i.e., spatialRelationInfo) for a dedicated-PUCCH, a dedicated-SRS, a PUSCH (a PUSCH scheduled by DCI format 0_0), a default spatial relation (or a default beam), an operation which associates an uplink beam RS with a downlink beam RS, may be defined.

When a spatial relation of a PUCCH/a SRS is not configured in FR2, a spatial relation for a PUCCH/a SRS may follow a TCI-state/QCL of a PDCCH/a CSI-RS/a SSB.

i) At least for UE supporting beam correspondence, when spatial relation information is not configured for a dedicated-PUCCH/SRS (excluding a SRS for beam management) in FR2, a default spatial relation for a dedicated-PUCCH/SRS may be applied.

ii) A default spatial relation applied to a dedicated-PUCCH/SRS in the i) may be selected among the following examples. In addition, the following examples may be also applied to not only a terminal which supports beam correspondence, but also a terminal which does not support beam correspondence.

A QCL assumption or a default TCI state of a PDSCH (e.g., related to the latest slot and the lowest CORESET ID);

One of activated TCI states of a CORESET

A TCI state of a PDCCH scheduling an A-SRS/PUCCH, and a TCI state or a QCL assumption of a PDSCH other than an A-SRS/PUCCH;

A QCL assumption for CORESET #0

A pathloss reference RS iii) For SRS resource(s) configured in a SRS resource set for nonCodebook that an associated CSI-RS is configured, a default spatial relation may not be applied.

In other words, the i) may be re-expressed as follows. At least for UE supporting beam correspondence, when spatial relation information is not configured for a dedicated-PUCCH/SRS (excluding a SRS for beam management, and a SRS for nonCodebook that an associatedCSI-RS is configured) in FR2, a default spatial relation for a dedicated-PUCCH/SRS may be applied.

iv) At least when a pathloss RS is not configured by RRC, a default spatial relation for a dedicated-PUCCH/SRS may be determined as follows.

When CORESET(s) are configured on a CC, a TCI state/QCL assumption of a CORESET having the lowest ID (a PL RS to be used is a QCL-TypeD RS of the same TCI state/QCL assumption of a CORESET having the lowest ID and a PL RS may be a periodic RS), or When a CORESET is not configured on a CC, an activated TCI state having the lowest ID which may be applied to a PDSCH in an activated DL-BWP of a CC It may apply at least beam correspondence to UE.

It may be applied at least in case of a single TRP.

Default Spatial Relation/Pathloss Reference Signal Update Based Uplink Transmission The present disclosure describes a variety of examples that a base station configures/updates to a terminal a default spatial relation (or a default beam) and/or a default pathloss RS (PL RS) for uplink transmission and reception (e.g., an uplink channel and/or an uplink RS). In addition, based on a configuration/update for a default spatial relation/PL RS for such uplink transmission and reception, various examples that a terminal performs uplink transmission (e.g., uplink channel/RS transmission) are described.

In the following example, a term "spatial parameter" may refer to a beam transmission and reception related parameter referred to for downlink reception or uplink transmission of a terminal.

For example, a spatial parameter related to downlink transmission and reception may include QCL information which is applied to a physical channel that downlink control information or data is transmitted and received or which is assumed by a terminal. QCL information may include QCL RS information and QCL RS information may be configured per QCL type (e.g., QCL type A/B/C/D). For example, downlink control information (DCI) may be transmitted and received through a PDCCH and a spatial parameter related to DCI transmission and reception may include QCL reference information, TCI state information, etc. for PDSCH DMRS antenna port. In addition, downlink data may be transmitted and received through a PDSCH and a spatial parameter related to downlink data transmission and reception may include QCL reference information, TCI state information, etc. for PDSCH DMRS antenna port(s).

But, in the present disclosure, a term of spatial parameter is not limited to QCL information and may include a spatial parameter applied to uplink transmission (e.g., spatial relation information related to an uplink transmission beam). For example, uplink control information (UCI) may be transmitted and received through a PUCCH and/or a PUSCH and a spatial parameter related to UCI transmission and reception may include a PRI (PUCCH resource indicator) related to PUCCH/PUSCH transmission and reception, spatial relation info or a QCL reference RS related thereto, etc.

In addition, a spatial parameter may be separately configured for a downlink or an uplink or may be integrated and configured for a downlink and an uplink.

In addition, a spatial parameter may be also defined or configured as a spatial parameter set including one or more spatial parameters. Hereinafter, one or more spatial parameters are collectively referred to as a spatial parameter to simplify a description.

In the following description, a term of a spatial parameter for uplink transmission may be substituted with a variety of terms such as an uplink spatial relation, an uplink transmission beam, an uplink beam, an uplink TCI state, etc. and in some examples, those terms may be used for a description instead of a spatial parameter. In addition, what is configured as default among spatial parameters for uplink transmission is referred to as a default spatial parameter, which may be substituted with a term such as a default spatial relation, a default transmission beam, a default beam, a default TCI state, etc. and in some examples, those terms may be used for a description instead of a default spatial parameter.

In the following description, uplink transmission may include transmission of a variety of uplink channels or uplink signals. For example, uplink transmission may correspond to PUSCH/PUCCH/SRS transmission, but it is not limited thereto, and examples of the present disclosure may be also applied to a variety of uplink transmission other than a PUSCH/a PUCCH/a SRS.

Hereinafter, examples of the present disclosure related to a default spatial parameter (e.g., spatial relation information)/a default PL RS for uplink transmission are described.

First, a summary of an uplink transmission operation for the existing single panel terminal and single TRP which does not consider one or more of multi-panel terminals or multiple TRPs is as follows.

A base station may configure a DL RS (i.e., a PL RS) as an open-loop power control parameter for pathloss compensation for uplink transmission of a terminal. For a PUCCH, the PL RS may be updated by updating a spatial parameter identifier (e.g., PUCCH-SpatialRelationInfoId) through a MAC CE message for each PUCCH resource. In addition, a method of updating a PL RS may be also applied to a PUSCH and a SRS through an individual MAC CE message. In addition, in order to improve efficiency through simplification of a terminal operation, for a spatial parameter (e.g., a transmission beam, or spatialRelationInfo) applied to a dedicated-PUCCH, a dedicated-SRS, a PUSCH (e.g., a PUSCH scheduled by DCI format 0_0), a default spatial parameter (or a default beam) may be defined. Further, a default PL RS may be also defined.

Additionally, in order to reduce an overhead of beam management for a dedicated-PUCCH and a dedicated-SRS, a 'default PL RS' based operation that a PL RS for an uplink is determined by spatial parameter (e.g., DL beam or DL RS) information for a PDCCH or a PDSCH may be defined. In addition, a base station may also configure whether a default PL RS based operation is enabled to a terminal.

For example, a condition that a default PL RS is enabled for a (dedicated-)PUCCH/SRS corresponds to a case in which a default beam enable parameter which is a RRC parameter (e.g., enableDefaultBeamPlForPUCCH for a PUCCH, enableDefaultBeamPlForSRS for a SRS) is configured in a state that a spatial parameter (e.g., spatial relation info) and a PL RS are not explicitly configured for a corresponding PUCCH/SRS. In this case, a terminal may configure a QCL Type-D RS (i.e., a DL beam RS) corresponding to the lowest CORESET ID as a (default) PL RS when a CORESET is configured in an activated BWP of a corresponding DL CC and may configure a QCL Type-D RS indicated in a TCI state corresponding to the lowest ID among TCI states for an activated PDSCH as a (default) PL RS when any CORESET is not configured in a corresponding DL BWP. When a PUCCH exists in an UL CC/BWP, at least one CORESET exists in a corresponding DL CC/BWP, so a QCL Type-D RS corresponding to the lowest CORESET ID may be configured as a (default) PL RS for a PUCCH. When a PUCCH exists in an UL CC/BWP, there is no case in which a CORESET is not configured, so a (default) PL RS configuration for it is not defined.

For a PUSCH, a default PL RS may be applied to a PUSCH scheduled by fallback DCI (e.g., DCI format 0_0). In a state that there is no PUCCH configured in a corresponding UL BWP (e.g., SCell UL) or a spatial parameter for a PUCCH (e.g., spatial relation) is not configured although a PUCCH is configured, when a default beam enable parameter which is a RRC parameter (e.g., enableDefaultBeamPlForPUSCH0_0 for a PUSCH) is configured, a default PL RS operation may be performed. In this case, a terminal may configure a QCL Type-D RS corresponding to the lowest CORESET ID of a DL CC/a BWP scheduling a PUSCH (or that DCI is monitored) as a (default) PL RS.

Additionally, in order to reduce an overhead for an UL beam configuration/indication for a terminal, for a spatial parameter (i.e., a transmission beam or spatialRelationInfo) for a dedicated-PUCCH, a dedicated-SRS, a PUSCH (e.g., a PUSCH scheduled by DCI format 0_0), 'a default spatial relation (or default beam or default spatial parameter)' based operation which associates an UL beam RS with a DL beam RS may be applied.

For example, for a SRS configuration excluding a SRS for a specific purpose (e.g., a SRS for beam management, a SRS for nonCodebook (when a associatedCSI-RS configuration is applied)), in a state that a spatial parameter (e.g., a spatial relation) and a PL RS are not explicitly configured for a corresponding PUCCH/SRS, a default beam enable parameter which is a RRC parameter (e.g., enableDefaultBeamPlForPUCCH for a PUCCH, enableDefaultBeamPlForSRS for a SRS) may be configured. In this case, a terminal may configure a QCL Type-D RS (i.e., a DL beam RS) corresponding to the lowest CORESET ID or a TCI state/QCL assumption of a corresponding CORESET as a default spatial parameter (or a default spatial relation) when a CORESET is configured in an activated BWP of a corresponding DL CC and may configure a QCL Type-D RS indicated in a TCI state corresponding to the lowest ID among TCI states for an activated PDSCH or a corresponding TCI state/QCL assumption as a default spatial parameter when any CORESET is not configured in a corresponding DL BWP. When a PUCCH exists in an UL CC/BWP, at least one CORESET exists in a corresponding DL CC/BWP, so a QCL Type-D RS corresponding to the lowest CORESET ID or a TCI state/QCL assumption of a corresponding CORESET may be configured as a default spatial parameter for a PUCCH. When a PUCCH exists in an UL CC/BWP, there is no case in which a CORESET is not configured, so a default spatial parameter configuration for it is not defined.

For a PUSCH, a default spatial parameter (or a default spatial relation) may be applied to a PUSCH scheduled by fallback DCI (e.g., DCI format 0_0). In a state that there is no PUCCH configured in a corresponding UL BWP (e.g., SCell UL) or that a spatial parameter for a PUCCH (e.g., a spatial relation) is not configured although a PUCCH is configured, when a default beam enable parameter which is a RRC parameter (e.g., enableDefaultBeamPlFor-PUSCH0_0 for a PUSCH) is configured, a default spatial parameter operation may be performed. In this case, a terminal may configure a TCI state/an QCL assumption corresponding to the lowest CORESET ID of a DL CC/a BWP scheduling a PUSCH (or that DCI is monitored) as a default spatial parameter.

As an additional example, for multiple TRPs (MTRP) PDSCH transmission and reception, a single DCI based operation and a multiple DCI based operation may be defined. In addition, MTRP transmission and reception may be defined for a variety of uplink/downlink transmission and reception other than a PDSCH (e.g., a PDCCH, a PUCCH, a PUSCH, etc.).

For example, for MTRP uplink transmission (e.g., a PUCCH/a PUSCH), a transmission occasion (TO) corresponding to each TRP may be configured/defined. Before each TO is configured/indicated and uplink transmission at a corresponding TO is scheduled/triggered, a transmission method applied to each TO may be configured by a base station to a terminal. For example, for MTRP PUSCH transmission, single DCI based scheduling or multiple DCI based scheduling may be applied, and before such scheduling (or with scheduling), TA (timing advance), a transmission rank, PUSCH DMRS port(s), a TPMI, a MCS, a (open-loop (OL)/closed-loop (CL)) power control parameter set, a transmission beam (or a spatial relation or a spatial parameter), a transmission panel, etc. for each of 2 or more of a plurality of TOs may be configured/indicated.

The definition on a default spatial parameter and a default PL RS does not consider any of uplink transmission of a multi-panel terminal or uplink transmission for multiple TRPs. In order to support a default spatial parameter/default PL RS based operation for a multi-panel terminal, a default spatial parameter/a default PL RS needs to be defined per each panel. In addition, by considering transmission and reception from/to MTRPs, a transmission and reception beam/panel may be different per each TO and/or per each TRP. Accordingly, in order to support one or more of uplink transmission of a multi-panel terminal or uplink transmission for multiple TRPs, a default spatial parameter/a default PL RS needs to be defined per panel/TRP/TO.

Accordingly, the present disclosure describes specific examples in which a base station configures/updates to a terminal a default spatial parameter and/or a default PL RS for uplink transmission and examples in which a terminal performs uplink transmission based on it.

Figure 11:
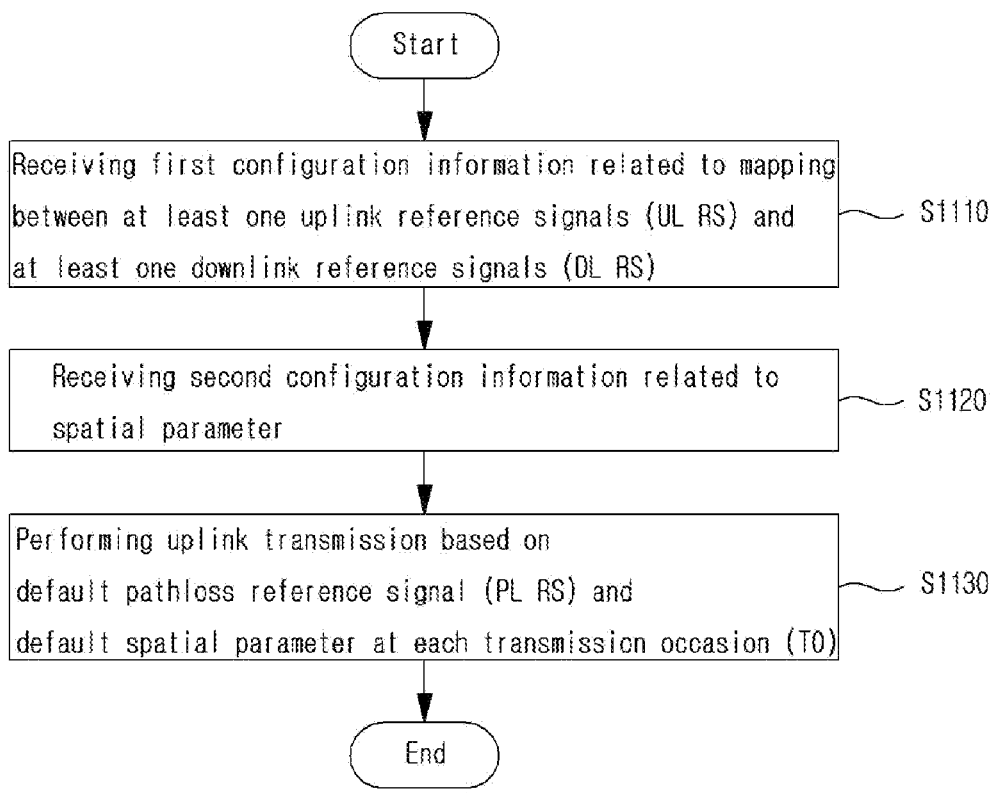
FIG. 11 is a flow chart for describing an uplink transmission operation of a terminal according to an embodiment of the present disclosure.

FIG. 11 is a flow chart for describing an uplink transmission operation of a terminal according to an embodiment of the present disclosure.

In S1110, a terminal may receive first configuration information related to mapping between one or more uplink reference signals (UL RS) and one or more downlink reference signals (DL RS) from a base station.

In S1120, a terminal may receive second configuration information related to a spatial parameter from a base station.

For example, second configuration information may include information related to candidate(s) of a spatial parameter. For example, second configuration information may be provided through higher layer signaling (e.g., a RRC/a MAC CE) or may be provided to a terminal through lower layer signaling (e.g., DCI).

Here, one or more UL RSs of first configuration information may be associated with spatial parameter candidate(s) of second configuration information. For example, uplink transmission may be performed based on an UL RS associated with a specific spatial parameter among spatial parameter candidate(s). A specific spatial parameter may be a default spatial parameter. A configuration/definition for a default spatial parameter may follow various examples of the present disclosure.

In addition, according to first configuration information, one or more DL RSs mapped to one or more UL RSs may be associated with power control for uplink transmission. For example, a DL RS mapped to an UL RS associated with a specific spatial parameter among spatial parameter candidate(s) may correspond to a specific PL (pathloss) RS and power control for uplink transmission may be performed based on a specific PL RS. A specific spatial parameter may be a default spatial parameter and a specific PL RS may be a default PL RS. A configuration/definition for a default PL RS may follow various examples of the present disclosure.

In addition, a DL RS may be also applied as an uplink spatial parameter. For example, candidate(s) of a spatial parameter configured by second configuration information may include a DL RS. In this case, a specific spatial parameter among spatial parameter candidate(s) may be a DL RS. When a specific spatial parameter for uplink transmission is a DL RS, a transmission beam (or a spatial domain filter value) based on a reception beam of the DL RS (or a spatial domain filter value) may be applied to uplink transmission. In this case, the specific DL RS may be applied as a default PL RS.

In S1130, a terminal may perform uplink transmission based on a default spatial parameter and a default PL RS at each TO.

For example, if uplink transmission at a plurality of (e.g., N (N is an integer exceeding 1)) TOs is assumed, N TOs may be associated with N default spatial parameters and N default PL RSs, respectively. For example, for N=2, uplink transmission may be performed based on a first default spatial parameter and a first default PL RS at a first TO and uplink transmission may be performed based on a second default spatial parameter and a second default PL RS at a second TO. Such a correlation between N TOs and N default spatial parameters/N default PL RSs may be configured/indicated by a base station or may be determined according to a predetermined rule without separate signaling.

A default spatial parameter/default PL RS at each TO may be one spatial parameter/PL RS which is predefined based on a predetermined rule (e.g., the lowest index/ID) among spatial parameter/PL RS candidate(s) configured by the second configuration information for a corresponding TO.

For example, when spatial parameter candidate(s) configured by second configuration information is an uplink reference signal (UL RS) (e.g., a SRS), a default spatial parameter applied to uplink transmission at a specific TO may correspond to one specific spatial parameter (e.g., an UL RS) among the spatial parameter candidate(s). In this case, a DL RS mapped to the one specific spatial parameter (e.g., an UL RS) may be determined as a default PL RS based on first configuration information. Accordingly, a terminal may perform uplink transmission based on a default spatial parameter/a default PL RS.

For example, when spatial parameter candidate(s) configured by second configuration information is a downlink reference signal (DL RS) (e.g., a SSB/a CSI-RS), a default spatial parameter applied to uplink transmission at a specific TO may be determined as an UL RS mapped based on one specific spatial parameter (e.g., a DL RS) and the first configuration information among the spatial parameter candidate(s). Alternatively, the one specific spatial parameter itself (e.g., a DL RS) may be determined as a default spatial parameter applied to uplink transmission (i.e., a transmission beam corresponding to a reception beam of a DL RS is applied to uplink transmission). In this case, the one specific spatial parameter (e.g., a DL RS) among spatial parameter candidate(s) based on second configuration information may be determined as a default PL RS. Accordingly, a terminal may perform uplink transmission based on a default spatial parameter/a default PL RS.

In relation to an example of FIG. 11, whether uplink transmission is enabled based on a default spatial parameter/a default PL RS may be preconfigured/pre-indicated for a terminal. When it is not enabled, a spatial parameter/a PL RS for uplink transmission may be explicitly indicated at each TO. When it is enabled, uplink transmission may be performed based on a default spatial parameter/a default PL RS at each TO.

In addition, in relation to an example of FIG. 11, a default spatial parameter/a default PL RS may be applied when a spatial parameter/a PL RS is not explicitly indicated for uplink transmission performed in S1130. When a spatial parameter/a PL RS is explicitly indicated for uplink transmission performed in S1130, uplink transmission may be performed accordingly.

In addition, in an example of FIG. 11, second configuration information for a spatial parameter in S1120 may be provided for a terminal through higher layer signaling, may be provided for a terminal through downlink control information (DCI) related to downlink reception of a terminal performed before uplink transmission in S1130 and may be provided for a terminal through DCI related to uplink transmission of a terminal performed before uplink transmission in S1130.

Embodiment 1

This embodiment is about a method of configuring a default spatial parameter/a default PL RS per (transmission) panel for specific uplink transmission of a multi-panel terminal. In addition, a configuration/an assumption of a terminal for a default spatial parameter/a default PL RS may be different for transmission for a STRP and transmission for MTRPs.

Embodiment 1-1

This embodiment is about a default spatial parameter/a default PL RS applied to uplink transmission of a multi-panel terminal to a STRP. This embodiment is described based on a multi-panel terminal, but it may be also applied to a single-panel terminal.

When specific uplink transmission of a multi-panel terminal (e.g., a dedicated-PUCCH, a dedicated-SRS, a PUSCH (e.g., a PUSCH scheduled by fallback DCI (e.g., DCI format 0_0) which does not include spatial parameter indication information)) is for STRP transmission, a terminal may configure/assume a default spatial parameter and a default PL RS of corresponding uplink transmission as the same one spatial parameter and the same one PL RS for all (transmission) panels.

For example, for a PUCCH/a SRS, based on a TCI state/a QCL Type-D RS of a CORESET of the lowest ID among CORESET(s) configured in an activated CC/BWP, or based on a TCI state of the lowest ID among TCI states for a PDSCH (activated through a MAC CE) when a CORESET is not configured in an activated CC/BWP, the one spatial parameter/one PL RS may be determined. For a PUSCH, based on a TCI state/a QCL Type-D RS of a CORESET of the lowest ID of a DL CC/a BWP that PUSCH scheduling DCI is transmitted, the one spatial parameter/one PL RS may be determined.

As such, for STRP uplink transmission of a terminal having one or more panels, by configuring/assuming a default PL RS for all of one or more (transmission) panels as the same one DL RS, a terminal may measure path loss from a target TRP to each panel by using the same DL RS. Accordingly, uplink transmission power for reaching a target TRP from each panel corresponding to a different direction (or beam) may be potentially different, so a transmission power value (by an open-loop power control parameter) applied to each panel may be calculated.

In addition, for STRP uplink transmission of a terminal having one or more panels, by configuring/assuming a default spatial parameter for all of one or more (transmission) panels as the same one DL RS, a terminal may apply a default uplink beam of each panel (i.e., a default spatial parameter, or a spatial domain (transmission) filter) by utilizing a spatial domain (reception) filter value corresponding to a reception beam which received a corresponding DL RS in each panel from a target TRP.

As an additional example, an UL RS (e.g., a SRS) may be included as a QCL Type-D RS of a DL TCI state. In this case, a QCL Type-D RS corresponding to the above-described lowest CORESET ID and/or a QCL Type-D RS indicated in a TCI state of the lowest ID among TCI states for an activated PDSCH, which may be configured as a default spatial parameter/a default PL RS, may be an UL RS.

In this case, when a (default) PL RS is configured as an UL RS, a terminal may configure/assume a PL RS which is configured/activated/indicated in association with a corresponding UL RS as a PL RS of target uplink transmission. In addition, when a (default) spatial parameter is configured as an UL RS, a terminal may perform target uplink transmission by utilizing a spatial parameter of a corresponding UL RS. Accordingly, even when an UL RS is introduced as a QCL Type-D RS, a terminal may perform an uplink transmission operation based on a default spatial parameter/a default PL RS.

Embodiment 1-2

This embodiment is about a default spatial parameter/a default PL RS applied to uplink transmission of a multi-panel terminal to MTRPs. This embodiment is described based on a multi-panel terminal, but it may be also applied to a single-panel terminal.

When specific uplink transmission of a multi-panel terminal (e.g., a dedicated-PUCCH, a dedicated-SRS, a PUSCH (e.g., a PUSCH scheduled by fallback DCI (e.g., DCI format 0_0) which does not include spatial parameter indication information)) is for MTRP transmission, a terminal may configure/assume a default spatial parameter and a default PL RS of corresponding uplink transmission differently per target TRP and/or per TO. Further, when each (transmission) panel of a multi-panel terminal is mapped/associated/configured to a specific target TRP and/or TO, a default spatial parameter and a default PL RS of each (transmission) panel may be configured/assumed differently per panel according to a corresponding relation.

In other words, a different default spatial parameter/default PL RS may be applied per TRP/TO/panel and accordingly, a plurality of default spatial parameters/default PL RSs may be applied to a plurality of TRPs/TOs/panels.

Hereinafter, examples of multiple DCI based uplink transmission and single DCI based uplink transmission are described.

Embodiment 1-2-1

When MTRP uplink transmission is performed based on multiple DCI, based on a CORESET group to which a CORESET belongs that DCI scheduling/triggering/indicating/configuring uplink transmission is received/monitored, a terminal may recognize a TRP for which corresponding uplink transmission heads.

It assumes a case in which a specific CORESET (or a specific CORESET group) and a specific TRP (or TO) are associated/mapped.

For example, for uplink transmission like a PUSCH/an aperiodic (AP)-SRS, based on a CORESET (or a CORESET group) in which DCI scheduling a PUSCH or triggering an AP-SRS is received/monitored, a terminal may recognize a TRP/TO to which target uplink transmission corresponds.

For a PUCCH or a periodic/semi-static SRS, a relation between specific target uplink transmission and a specific CORESET (or CORESET group) and/or a specific TRP/TO may be configured/indicated/updated through RRC/MAC signaling. For example, for a PUCCH, a specific PUCCH resource group and/or a PUCCH resource set may be associated with/mapped to a specific CORESET/CORESET group and/or a specific TRP/TO. For a periodic SRS or a semi-static SRS, a specific SRS resource set may be associated with/mapped to a specific CORESET/CORESET group and/or a specific TRP/TO.

A case in which a CORESET is configured in a CC/a BWP that uplink transmission is performed is described first.

In this case, a default spatial parameter and a default PL RS of specific uplink transmission for each TRP/TO may be determined based on one or more of i) a specific CORESET in a CORESET group associated with/configured for each TRP/TO, or ii) a specific CORESET configured for a specific cell among cell(s) configured for each TRP/TO.

For example, a specific CORESET may be a CORESET having the lowest ID.

In addition, cell(s) configured for each TRP/TO may be cell(s) that a different CORESET group (or a CORESET pool having a different index) is configured together and/or cell(s) related to a CORESET group associated with/configured for a corresponding TRP/TO. In other words, one or more cells configured for each TRP/TO may be related to a different CORESET or may be related to the same CORESET.

For example, a specific cell may be a cell having the lowest ID.

A specific example on the i) for a case in which a CORESET is configured in a CC/a BWP that uplink transmission is performed is described.

For example, based on an association/a configuration between a TRP/a TO and a CORESET group, a terminal may configure/assume that a default spatial parameter/a default PL RS applied to uplink transmission for a specific TRP/TO is a QCL Type-D RS corresponding to the lowest CORESET ID in a CORESET group associated with the specific TRP/TO.

Additionally or alternatively, a terminal may configure/assume that a QCL Type-D RS corresponding to a specific CORESET (e.g., a CORESET having the lowest ID) within specific cell(s) among serving cell(s) configured for a terminal (e.g., a serving cell having the lowest ID among cells that CORESETs corresponding to a different CORESET group are configured together and/or serving cells having the lowest ID among cells that a CORESET corresponding to each CORESET group is configured) is a default spatial parameter/a default PL RS of specific uplink transmission for each TRP/TO scheduled/triggered/indicated/configured for a different CORESET group.

A specific example on the ii) for a case in which a CORESET is configured in a CC/a BWP that uplink transmission is performed is described.

For example, a situation is assumed that CORESET group #0 (or CORESETPoolIndex 0) corresponds to cell #0, CORESET group #0 and #1 (or CORESETPoolIndex 0/1) corresponds to cell #1, CORESET group #0 (or CORESETPoolIndex 0) corresponds to cell #2 and CORESET group #0 and #1 (or CORESETPoolIndex 0/1) corresponds to cell #3. In addition, it is assumed that COREST group #0 (or CORESETPoolIndex 0) corresponds to TRP1 and COREST group #1 (or CORESETPoolIndex 1) corresponds to TRP2.

In this case, for each of TRP1 and TRP2, serving cells that different CORESETPoolIndex is configured together are cell #1 and #3 and among them, a serving cell having the lowest ID is cell #1. Accordingly, it may be configured/assumed that a CORESET having the lowest ID among CORESET(s) of CORESETPoolIndex 0 and a CORESET having the lowest ID among CORESET(s) of CORESETPoolIndex 1 are used in cell #1.

Additionally or alternatively, serving cells including CORESETPoolIndex 0 for TRP1 are cell #0, #1, #2 and 3 and among them, a serving cell having the lowest ID is cell #0. Accordingly, it may be configured/assumed that a CORESET having the lowest ID among CORESET(s) of CORESETPoolIndex 0 is used in cell #0. In addition, serving cells including CORESETPoolIndex 1 for TRP2 are cell #1 and #3 and among them, a serving cell having the lowest ID is cell #1. Accordingly, it may be configured/assumed that a CORESET having the lowest ID among CORESET(s) of CORESETPoolIndex 1 is used in cell #1.

Based on a spatial parameter/DL RS configured for a specific CORESET assumed to be used as above, a default spatial parameter/a default PL RS of uplink transmission may be determined. In other words, through a configuration/an assumption for a specific CORESET as described above, a default spatial parameter/a default PL RS related to a reception beam when receiving DCI scheduling/triggering/indicating corresponding uplink transmission may be configured/assumed. Accordingly, a transmission beam direction and transmission power of specific uplink transmission for each TRP may be determined.

Hereinafter, a case in which a CORESET is not configured in a CC/a BWP that uplink transmission is performed is described.

For example, for multiple DCI based MTRP uplink transmission, a CORESET may not be configured in a CC/a BWP that MTRP uplink transmission is performed. In this case, a terminal may apply a configuration/an assumption for a default spatial parameter/a default PL RS as follows.

In this case, a default spatial parameter and a default PL RS of specific uplink transmission for each TRP/TO may be determined based on one or more of i) a QCL Type-D RS indicated in specific TCI state(s) among TCI states for a PDSCH activated in a corresponding CC/BWP (that MTRP uplink transmission is performed), or ii) a QCL Type-D RS indicated in specific TCI state(s) among TCI states for a PDSCH activated in each CC/BWP to which a CORESET associated/configured for each TRP/TO belongs.

The specific TCI state(s) among TCI states for a PDSCH activated in a corresponding CC/BWP (that MTRP uplink transmission is performed) may be TCI state(s) having the lowest ID associated/configured for each TRP/TO (e.g., any one ID of the lowest, second-lowest, third-lowest ID when a TRP/a TO is one of 3 TRPs/TOs).

The specific TCI state(s) among TCI states for a PDSCH activated in each CC/BWP to which a CORESET associated/configured for each TRP/TO belongs may be TCI state(s) having the lowest ID.

A specific example on the i) for a case in which a CORESET is not configured in a CC/a BWP that uplink transmission is performed is described.

For example, a relation between specific target uplink transmission and a specific CORESET/TRP/TO may be defined/configured/indicated. In this case, among TCI states for a PDSCH activated in a corresponding CC/BWP (that MTRP uplink transmission is performed), a QCL Type-D RS indicated in a TCI state corresponding to the lowest ID may be associated with a specific TRP/TO and a QCL Type-D RS indicated in a TCI state corresponding to the second-lowest ID may be associated with other TRP/T2. For uplink transmission for more than 2 TRPs, additionally, a QCL Type-D RS indicated in a TCI state corresponding to the third-lowest ID may be associated with another TRP/TO. Here, a mapping relation between a TCI state ID and a TRP/TO index may be determined according to a predefined or preconfigured rule. For example, it may be associated with TRP1/TO1, TRP2/TO2, TRP3/TO3, . . . in ascending order from the lowest TCI state ID in a form of pairing or an ordered pair. Accordingly, for uplink transmission for each TRP/TO, a default spatial parameter/a default PL RS may be configured/assumed.

A specific example on the ii) for a case in which a CORESET is not configured in a CC/a BWP that uplink transmission is performed is described.

For example, a relation between specific target uplink transmission and a specific CORESET/TRP/TO may be defined/configured/indicated. In this case, a QCL Type-D RS indicated in a TCI state having the lowest ID among TCI states for a PDSCH activated in each CC/BWP to which a CORESET scheduling corresponding target uplink transmission (or associated with/mapped to a target uplink channel) belongs may be configured/assumed as a default spatial parameter/a default PL RS for uplink transmission for each TRP/TO. In other words, there is no CORESET in a CC/a BWP that MTRP uplink transmission is performed, so a QCL Type-D RS indicated in a TCI state having the lowest ID among TCI states for a PDSCH activated in a CC/a BWP to which a CORESET scheduling/triggering/indicating/configuring specific uplink transmission belongs may be utilized as a default spatial parameter/a default PL RS.

As an additional example, when there is no CORESET in a CC/a BWP that MTRP uplink transmission is performed, a default spatial parameter/a default PL RS may be configured/assumed based on a QCL Type-D RS of a CORESET having the lowest ID in a CORESET group to which a CORESET scheduling/triggering/indicating/configuring specific uplink transmission belongs.

Embodiment 1-2-2

When MTRP uplink transmission is performed based on single DCI, a spatial parameter may be preconfigured for each TRP/TO and a terminal may configure/assume a default spatial parameter/a default PL RS based on a preconfigured spatial parameter.

For example, a spatial parameter configured through higher layer signaling (e.g., RRC or MAC CE signaling) for each TRP/TO may be spatialRelationInfo/UL-TCI and a DL RS (e.g., a SSB-RI, a CRI)/an UL RS (e.g., a SRI) may be linked/associated/referred to for each TRP/TO by spatialRelationInfo/UL-TCI. Accordingly, a spatial parameter of uplink transmission for each TRP/TO may be (semi-statically) configured/updated. In this case, a spatial parameter which is preconfigured for each TRP/TO (e.g., a RS associated with each TRP/TO) may be configured/assumed as a default spatial parameter/a default PL RS which will be applied to uplink transmission for each TRP/TO.

As an additional example, in order to configure/indicate a spatial parameter for MTRP uplink transmission more dynamically, indication information on a plurality of spatial parameters which will be applied to a plurality of uplink TOs may be included in DCI (i.e., single DCI) for scheduling/triggering/indicating MTRP uplink transmission. For example, spatial parameter indication information included in DCI may be provided for a terminal through a plurality of SRI fields or UL-TCI fields (e.g., as many as the number of TRPs/TOs). When the number of TRPs/TOs is N, each of N SRI/UL-TCI fields may indicate a DL RS (e.g., a SSB-RI, a CRI)/an UL RS (e.g., a SRI). Accordingly, a dynamic uplink spatial parameter indication may be possible.

Alternatively, one SRI/UL-TCI field may be included in DCI (i.e., single DCI) for scheduling/triggering/indicating MTRP uplink transmission. In this case, one SRI/UL-TCI field may indicate one codepoint among a plurality of codepoints and each of a plurality of codepoints may include one or a plurality of spatial parameters. In other words, N transmission beams for N TOs/towards N TRPs may be indicated through one SRI/UL-TCI field. One codepoint may link/connect a reference RS (e.g., a DL RS/an UL RS) for N transmission beams (in a form of an ordered pair) through a higher layer (e.g., a RRC/a MAC CE) configuration/description. In other words, a plurality of codepoints (i.e., candidates of a spatial parameter set) may be preconfigured by higher layer signaling and one codepoint (i.e., one set of a plurality of spatial parameters) among a plurality of codepoints (i.e., candidates of a spatial parameter set) may be indicated for a terminal by DCI.

As described above, when a plurality of (e.g., N) spatial parameters are configured/indicated to a terminal through one/a plurality of spatial parameter indication fields (e.g., one/a plurality of SRI/UL-TCI fields) in DCI for MTRP uplink transmission, a terminal may configure/assume a default spatial parameter/a default PL RS based on a specific spatial parameter among a plurality of spatial parameters. For example, N spatial parameters may correspond to a codepoint of a SRI field or an UL-TCI field linked/connected with a reference RS (e.g., a DL RS/an UL RS) (in a form of an ordered pair). A reference RS (e.g., a DL RS/an UL RS) liked/connected by a RRC configuration to a SRI field of the lowest index or the lowest UL-TCI field among N spatial parameters may be configured/assumed as a default spatial parameter/a default PL RS for specific uplink transmission for each TRP/TO.

In other words, a default spatial parameter/a default PL RS which will be applied to specific uplink transmission for N TRPs/TOs may be configured/assumed by a terminal as one specific spatial parameter (e.g., corresponding to the lowest index/ID) among N spatial parameters indicated through a SRI/UL-TCI field of DCI related to other uplink transmission before the specific uplink transmission.

As an additional example, a default spatial parameter/a default PL RS which will be applied to uplink transmission may be configured/assumed as one specific spatial parameter among N spatial parameters configured/indicated through DCI related to downlink reception before uplink transmission.

For example, a default spatial parameter/a default PL RS may be applied to a PUCCH carrying ACK/NACK information for downlink reception (e.g., HARQ-ACK). In this case, a PUCCH resource indicated by a PRI field in DCI (i.e., downlink grant DCI) scheduling downlink data for supporting a MTRP PUCCH may be mapped/associated with a plurality of spatial parameters. For example, a PRI field of DL grant DCI may indicate one of a plurality of codepoints, and for each of a plurality of codepoints, i) one PUCCH resource that a plurality of spatial parameters (e.g., spatial relation info/UL TCI states/unified TCI states) are configured may be configured/mapped, or ii) a plurality of PUCCH resources may be configured/mapped. Accordingly, for one codepoint indicated by a PRI field, a default spatial parameter/a default PL RS may be configured/assumed based on one specific spatial parameter among a plurality of spatial parameters of one or more PUCCH resources.

As a specific example of the i), among PRI field codepoints that one PUCCH resource that a plurality of spatial relation info/UL TCI states/unified TCI states are configured is configured/mapped, a plurality of reference RSs (e.g., DL RS/UL RS) corresponding to a codepoint of the lowest index may be utilized as a default spatial parameter/a default PL RS for MTRP PUCCH transmission of a terminal.

Additionally or alternatively, as a specific example of the ii), among PRI field codepoints that a plurality of PUCCH resources are configured/mapped, a reference RS of a plurality of PUCCH resources (e.g., DL RS/UL RS) corresponding to a codepoint of the lowest index may be utilized as a default spatial parameter/a default PL RS for MTRP PUCCH transmission of a terminal.

For the above-described examples, a SRI field or an UL-TCI field may be substituted with a DL/UL unified TCI state field. A DL/UL unified TCI state field is not intended to limit a scope of the present disclosure by its name, and may refer to a spatial parameter indication field which is extended so that a QCL type-D RS and/or a spatial relation reference RS (e.g., a DL RS/an UL RS) of a TCI state having a specific ID can be used as both a reference RS of a DL reception beam and a reference RS of an UL transmission beam.

For example, when a DL/UL RS indicated in an UL-TCI field and/or a DL/UL unified TCI state field is utilized for configuring/indicating a transmission beam of a PUCCH (e.g., when configuring/indicating a spatial parameter of an A/N PUCCH by substituting a PRI field), similar to the above-described examples, as a default spatial parameter/a default PL RS for PUCCH transmission for each TRP/TO, a plurality of reference RSs (e.g., a DL RS/an UL RS) corresponding to a specific codepoint (e.g., of the lowest index) among codepoints that a plurality of spatial parameters indicated by the UL-TCI field and/or DL/UL unified TCI state field (e.g., a reference RS for a transmission beam (e.g., a DL RS/an UL RS)) are linked/connected (in a form of an ordered pair) may be configured/assumed. In addition, a plurality of reference RSs corresponding to the specific codepoint (e.g., a DL RS/an UL RS) may be utilized as a default spatial parameter/a default PL RS for PUSCH/SRS transmission for each TRP/TO.

Additionally or alternatively, for MTRP uplink transmission of a terminal, as a default spatial parameter/a default PL RS for specific uplink transmission for each TRP/TO, a plurality of reference RSs (e.g., a DL RS/an UL RS) configured in a TCI state corresponding to the lowest ID among TCI states that a plurality of reference RSs (e.g., a DL RS/an UL RS) for a plurality of Tx(/Rx) beams in a set (e.g., a pool) of DL/UL unified TCI state candidates are linked/connected (in a form of an ordered pair) may be utilized.

As described above, additional examples on a case in which a CORESET is not configured in a corresponding CC/BWP (that MTRP downlink/uplink transmission and reception are performed), or a case in which single DCI based MTRP DL/UL transmission and reception are performed are described below.

For single DCI based MTRP downlink transmission and reception, for a terminal reception beam indication for a PDSCH from each TRP, when a CORESET is not configured in a corresponding CC/BWP, a TCI state field in DL grant DCI may indicate/activate one specific codepoint among one or more codepoint candidates. Here, each of one or more codepoint candidates may be configured/associated/mapped to 2 or more TCI states(s) (ID). Accordingly, 2 or more TCI states(s) (ID) corresponding to one specific codepoint indicated by a TCI state field of DCI may be activated.

For MTRP uplink transmission of a terminal, as a default spatial parameter/a default PL RS for specific uplink transmission for each TRP/TO, among one or more codepoint candidates related to a TCI field of the DL grand DCI, a transmission and reception beam reference DL RS/UL RS of 2 or more TCI states corresponding to a codepoint of the lowest index may be utilized.

If a CORESET is not configured in a corresponding CC/BWP (that MTRP uplink transmission is performed), a terminal may utilize a transmission and reception beam reference DL RS/UL RS of 2 or more TCI states corresponding to a codepoint of the lowest index among one or more codepoint candidates related to a TCI field of DL grant DCI as a default spatial parameter/a default PL RS in a CC/a BWP scheduling corresponding uplink transmission.

For the above-described examples, a base station may define/configure/indicate a corresponding relation between a plurality of default spatial parameters/default PL RSs and a plurality of TOs (or a plurality of TO groups) that uplink transmission is performed.

Even when a TO that a single-panel terminal performs MTRP uplink transmission is TDM-ed, the above-described examples may be also applied to a configuration/an assumption of a default spatial parameter/a default PL RS for uplink transmission for each TRP/TO. In addition, even when a TO that a multi-panel terminal performs MTRP uplink transmission is TDM/SDM/FDM-ed, the above-described examples may be also applied to a configuration/an assumption of a default spatial parameter/a default PL RS for uplink transmission for each TRP/TO. In addition, when a specific (transmission) panel of a multi-panel terminal is mapped/associated/configured to uplink transmission for each TRP/

TO, the above-described examples may be also applied to a configuration/an assumption of a default spatial parameter/a default PL RS per panel.

Embodiment 1-3

For a single-panel terminal or a multi-panel terminal, when MTRP uplink transmission (or uplink TO) is performed by a SDM/FDM/SFN (single frequency network) method, uplink power control may be performed based on one specific TRP/TO. Here, a SFN method may include transmitting the same information at the same time for MTRPs.

For example, both open-loop/closed-loop power control per TO and/or per destination TRP of UE-specific uplink transmission may be performed by one process (e.g., a power control parameter set) based on one specific TRP.

Here, a specific TRP/TO may be one or more of a default TRP/TO which is defined/configured in advance, a TRP/a TO which is closest to a terminal (e.g., with the highest received signal strength), or a TRP/a TO which is farthest from a terminal (e.g., with the lowest received signal strength). When power control for all multiple TRPs/TOs is performed based on a TRP/a TO which is closest to a terminal, an effect of reducing terminal power may be gained. When power control for all multiple TRPs/TOs is performed based on a TRP/a TO which is farthest from a terminal, a diversity effect or an effect of improving a SNR may be obtained although power consumption increases.

For MTRP uplink transmission, a method of performing power control based on one specific TRP/TO may be also applied/utilized for a configuration/an assumption of a default spatial parameter/a default PL RS of a terminal as described above. For example, a terminal may apply a default spatial parameter/a default PL RS configured/assumed for the one specific TRP/TO to all multiple TRPs/TOs. In other words, the same default spatial parameter/default PL RS may be applied at multiple TRPs/TOs. In this case, even when a TRP/a TO is associated with a (transmission) panel in a multi-panel terminal, a configuration/an assumption for a default spatial parameter/a default PL RS may be the same in multiple panels.

For detailed examples in the above-described embodiment 1-2 and 1-3, an UL RS (e.g., a SRS) other than a DL RS (e.g., a SSB/a CSI-RS) may be included as a QCL Type-D RS of a DL TCI state. When an UL RS is configured/assumed as a default spatial parameter/a default PL RS, a terminal may perform a configuration/an assumption for a default spatial parameter/a default PL RS similarly as in embodiment 1-1. In other words, even for embodiment 1-2 and 1-3, when a (default) PL RS is configured as an UL RS, a terminal may configure/assume a PL RS which is configured/activated/indicated in association with a corresponding UL RS as a PL RS of target uplink transmission. In addition, when a (default) spatial parameter is configured as an UL RS, a terminal may perform target uplink transmission by utilizing a spatial parameter of a corresponding UL RS. Accordingly, even when an UL RS is introduced as a QCL Type-D RS, a terminal may perform an uplink transmission operation based on a default spatial parameter/a default PL RS.

Detailed examples of the above-described embodiment 1 are not applied only to MTRP uplink transmission and may be also applied to uplink transmission when multi-cells or CA (carrier aggregation) is configured or when repeat transmission is configured in a single cell. For example, when one DCI schedules uplink transmission in a plurality of cells (e.g., PUSCH transmission) at a time, a configuration/an assumption for a default spatial parameter/a default PL RS for each cell may be applied by considering that PUSCH transmission in each cell corresponds to a plurality of TRPs/TOs in the above-described examples. Also for repeat transmission, a configuration/an assumption for a default spatial parameter/a default PL RS for each cell may be applied by considering that a plurality of repeat transmission occasions correspond to a plurality of TRPs/TOs in the above-described examples.

In addition, for an operation according to detailed examples of embodiment 1, whether it is enabled (e.g., on/off switching) may be configured/indicated by higher layer (e.g., RRC/MAC CE) signaling per target uplink transmission.

Embodiment 2

This embodiment is about a default spatial parameter/a default PL RS for PUSCH transmission scheduled by DCI (e.g., DCI format 0_1) including spatial parameter indication information, not fallback DCI.

The above-described default spatial relation (or default beam) and default PL RS based operation for STRP transmission may be applied to a PUSCH scheduled by fallback DCI (e.g., DCI format 0_0 which does not include spatial parameter indication information), or may be applied to a PUCCH or a SRS. In addition, whether such a default spatial relation and default PL RS based operation is enabled may be configured by a base station to a terminal through the following 3 RRC parameters.

enableDefaultBeamPlForPUSCH0_0 for a PUSCH scheduled by DCI format 0_0
  enableDefaultBeamPlForPUCCH for a dedicated PUCCH
  enableDefaultBeamPlForSRS for a dedicated SRS A method of applying such a default spatial relation and default PL RS operation to a PUSCH scheduled by DCI format 0_1, a non-fallback DCI format, is not determined yet.

For DCI format 0_1, a PUSCH spatial relation is explicitly indicated by indicating a SRS resource for a CB or a NCB through a SRI field in a DCI payload. When a PUSCH default spatial parameter/default PL RS based operation is applied, a problem may occur that it collides with spatial relation information indicated by a SRI.

In addition, a SRS for a CB or a NCB may be applied to perform UL link adaptation before PUSCH scheduling. If a default spatial parameter/default PL RS based operation is enabled (or is configured as on) for a PUSCH scheduled by DCI format 0_1 and it is disabled (or is configured as off) for a SRS, a SRS for a CB or a NCB for link adaptation is transmitted based on an uplink beam by a specific spatial relation configuration and a PUSCH is transmitted based on an uplink beam corresponding to a default spatial relation, so a problem may occur that a beam for link adaptation is different from a PUSCH beam.

In order to solve such a problem, the following examples may be applied.

Embodiment 2-1

When a default spatial parameter/default PL RS based operation is enabled (or is on) for a PUSCH scheduled by DCI format 0_1, a terminal may expect that a spatial parameter will not be configured for SRS resource(s) in SRS resource set(s) for a CB or a NCB (or a base station may not configure for a terminal a spatial parameter for SRS resource(s) in SRS resource set(s) for a CB or a NCB). Accordingly, although there is a spatial parameter indication for a PUSCH through a SRI field in DCI format 0_1 (without ambiguity because a spatial parameter is not configured for SRS resource(s) indicated by a SRI field), a terminal may perform PUSCH transmission based on a configuration/an assumption of a default spatial parameter/a default PL RS for a corresponding PUSCH.

As an additional example, a terminal may apply a default spatial parameter/a default PL RS configured for a PUSCH scheduled by DCI format 0_1 for SRS resource(s) in SRS resource set(s) for a CB or a NCB that a spatial parameter is not configured. It is to solve a problem that a spatial parameter (or an uplink beam) of SRS transmission for uplink link adaptation is different from that of PUSCH transmission performed based on a corresponding link adaptation result. Accordingly, a spatial parameter (or beam) of a PUSCH scheduled by DCI format 0_1 and a SRS for link adaptation may be arranged.

Embodiment 2-2

When a default spatial parameter/default PL RS based operation is enabled (or is on) for a PUSCH scheduled by DCI format 0_1, a terminal may ignore a spatial parameter for SRS resource(s) indicated by a SRI and perform PUSCH transmission based on a default spatial parameter/a default PL RS for a PUSCH although a spatial parameter is configured for SRS resource(s) (which will be indicated by a SRI field) in SRS resource set(s) for a CB or a NCB. Accordingly, although a spatial parameter is configured for a SRS resource for link adaptation and a corresponding SRS resource is indicated by a SRI field, high priority is given to a default spatial parameter/default PL RS based operation for a PUSCH scheduled by DCI format 0_1. Accordingly, ambiguity for a spatial parameter (or beam) which will be applied to a PUSCH may be removed.

As an additional example, for SRS resource(s) in SRS resource set(s) for a CB or a NCB that a spatial parameter is configured, when transmitting a corresponding SRS resource by configuration/activation/triggering of a base station, a terminal may ignore a spatial parameter which is preconfigured for a corresponding SRS resource and apply a default spatial parameter/a default PL RS configured/assumed for a PUSCH scheduled by DCI format 0_1. Accordingly, a spatial parameter (or beam) of a PUSCH scheduled by DCI format 0_1 and a SRS for link adaptation may be arranged.

Embodiment 2-3

A terminal may expect that whether a default spatial parameter/default PL RS based operation is enabled for a PUSCH scheduled by DCI format 0_1 will be the same as whether a default spatial parameter/default PL RS based operation for a SRS is enabled. In other words, a terminal may expect that both a default spatial parameter/default PL RS based operation will be enabled (or on) or will be disabled (or off) for a non-fallback DCI based PUSCH and SRS (or a base station may configure a terminal to enable or disable both a default spatial parameter/default PL RS based operation for a non-fallback DCI based PUSCH and SRS). Accordingly, a spatial parameter (or uplink beam) of PUSCH transmission performed based on a SRS for link adaptation and a corresponding link adaptation result may be determined based on a default spatial parameter/a default PL RS or may be determined based on a spatial parameter configured for a SRS resource indicated by a SRI, so a spatial parameter (or beam) of a PUSCH scheduled by DCI format 0_1 and a SRS for link adaptation may be arranged.

In the above-described examples, an enable parameter for a default spatial parameter/default PL RS based operation for a PUSCH scheduled by DCI format 0_1 may be defined as an enable parameter integrated with an enable parameter for a default spatial parameter/default PL RS based operation for a PUSCH scheduled by DCI format 0_0, or may be defined as a separate enable parameter. When it is defined as a separate enable parameter, each enable parameter may indicate whether to enable equally or may indicate whether to enable differently.

In the above-described examples, a mapping relation between a plurality of TOs and a plurality of default spatial parameters/default PL RSs may be applied to a variety of methods. Such a mapping method may be preconfigured by a base station or a specific mapping method may be applied without separate signaling. In the following examples, the number of TOs may be the same as or different from the number of default spatial parameters/default PL RSs.

For example, a plurality of default spatial parameters/default PL RSs may be cyclically mapped sequentially in ascending order of indexes of a plurality of TOs.

As an additional example, a plurality of TOs may be mapped to a plurality of TO groups and a plurality of default spatial parameters/default PL RSs may be sequentially mapped in ascending order of indexes of a plurality of TO groups.

As an additional example, a plurality of TOs may be mapped to a plurality of TO groups and a plurality of default spatial parameters/default PL RSs may be cyclically mapped sequentially in ascending order of indexes of a TO group per TO group.

Figure 12:
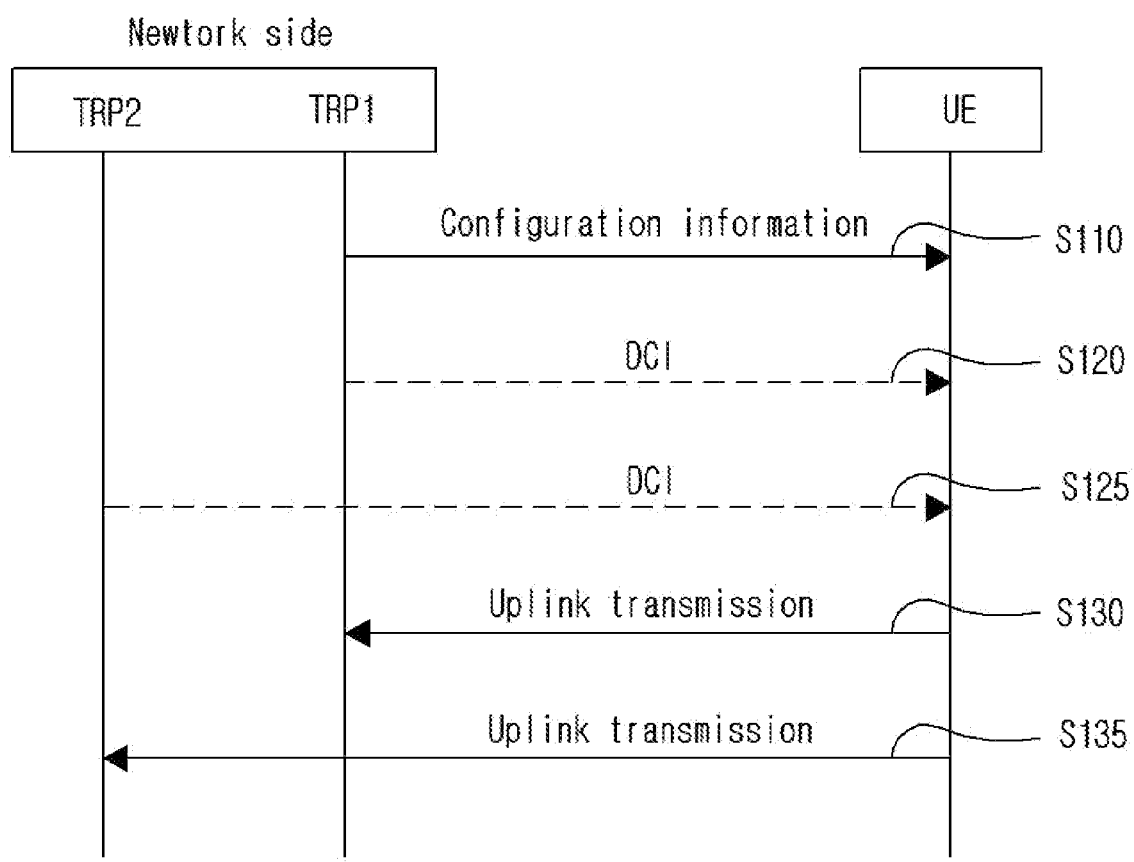
FIG. 12 is a diagram illustrating a signaling procedure between a base station and a terminal for a method of transmitting and receiving an uplink according to an embodiment of the present disclosure.

FIG. 12 is a diagram illustrating a signaling procedure between a base station and a terminal for an uplink transmission and reception method according to an embodiment of the present disclosure.

An example on an operation of a base station and a terminal for a default spatial parameter/default PL RS based uplink transmission and reception operation according to the above-described embodiment 1/2/3 and detailed examples thereof is as follows.

A base station may transmit configuration information related to uplink transmission (e.g., STRP/MTRP uplink transmission) to a terminal and a terminal may receive it. In addition, a default spatial parameter/a default PL RS for uplink transmission of a terminal may be configured/assumed. In addition, whether a default spatial parameter/default PL RS based operation is enabled may be configured by a base station to a terminal. For example, through an enableDefaultBeamPl parameter for specific uplink transmission (e.g., a PUSCH/a PUCCH/a SRS), whether a default spatial parameter/default PL RS based operation is enabled for corresponding uplink transmission may be configured. In embodiment 1-1, for uplink transmission for a STRP, examples on a default spatial parameter/default PL RS configuration/assumption are included. In embodiment 1-2 and 1-3, for uplink transmission for MTRPs, examples on a default spatial parameter/default PL RS configuration/assumption per TRP/TO are included.

A terminal may calculate uplink transmission power based on a default PL RS. For example, uplink transmission power may be calculated per each TRP/TO and as in embodiment 1-3, uplink transmission power may be calculated based on one TRP/TO. A terminal may perform uplink transmission based on calculated transmission power and a base station may receive it.

In addition, a spatial parameter which is referred to by a terminal for uplink transmission may be based on a default spatial parameter.

The above-described terminal/base station operation is just an example, and each operation (or each step) is not necessarily required, and an operation related to STRP/MTRP transmission according to the above-described embodiments may be omitted or added according to an implementation method of a terminal/a base station.

Operations of a base station/a terminal according to the above-described examples (e.g., an operation related to STRP/MTRP uplink transmission based on one or more of embodiment 1/2/3 and detailed examples thereof) may be processed by a device of FIG. 13 which will be described later (e.g., a processor 102 and 202 of FIG. 13).

Figure 13:
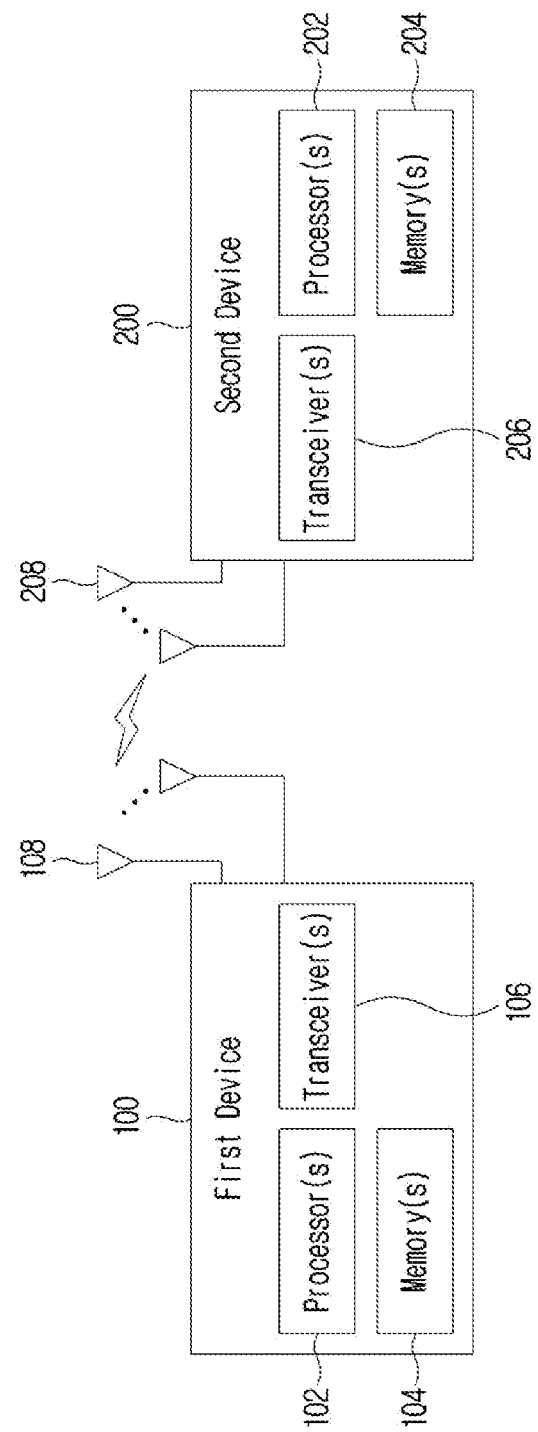
FIG. 13 illustrates a block diagram of a wireless communication system according to an embodiment of the present disclosure.

In addition, operations of a base station/a terminal according to the above-described embodiment (e.g., an operation related to STRP/MTRP uplink transmission based on one or more of embodiment 1/2/3 and detailed examples thereof) may be stored in a memory (e.g., 104 and 204 in FIG. 13) in a form of a command/a program (e.g., an instruction, an executable code) for driving at least one processor (e.g., 102 and 202 in FIG. 13).

FIG. 12 represents signaling between UE and a network side (e.g., TRP1 and TRP2) under a situation of multi-TRPs (or multi-cells, hereinafter, a TRP may be substituted with a term of a cell) to which methods proposed in the present disclosure (e.g., one or more of embodiment 1/2/3 and detailed examples thereof) may be applied. Here, UE/a network side is just an example and may be applied by being substituted with a variety of devices described in relation to FIG. 13. FIG. 12 is just for convenience of a description, and it does not limit a scope of the present disclosure. In addition, some step (s) shown in FIG. 12 may be omitted according to a situation and/or a configuration, etc.

In reference to FIG. 12, for convenience of a description, signaling between 2 TRPs and UE is considered, but it goes without saying that a corresponding signaling method may be extended and applied to signaling between multiple TRPs and multiple UE. In the following description, a network side may be one base station (BS) including a plurality of TRPs or may be one cell including a plurality of TRPs. In an example, an ideal/non-ideal backhaul may be configured between TRP 1 and TRP 2 configuring a network side. In addition, the following description is described based on multiple TRPs, but it may be also equally extended and applied to transmission through multiple panels. In addition, in the present disclosure, an operation that a terminal receives a signal from TRP1/TRP2 may be interpreted/described (or may be an operation) as an operation that a terminal receives a signal from a network side (through/with TRP1/2) and an operation that a terminal transmits a signal to TRP1/TRP2 may be interpreted/described (or may be an operation) as an operation that a terminal transmits a signal to a network side (through/with TRP1/TRP2) or may be inversely interpreted/described.

UE may receive configuration information from a BS (a network side) (e.g., TRP 1) S110. The configuration information may be configuration information based on one or more of the above-described embodiment 1/2/3 and detailed examples thereof. Specifically, the configuration information may include information on at least one of a default spatial parameter or a default PL RS related to uplink transmission. Here, UE may be a single-panel terminal and/or a multi-panel terminal.

The uplink transmission may include at least one of a PUCCH, a SRS or a PUSCH.

For example, the configuration information may include information on at least one of a default spatial parameter or a default PL RS for the uplink transmission related to a STRP. Based on the configuration information, a default spatial parameter and a default PL RS related to all (Tx) panels of UE may be configured as one RS per each uplink transmission (e.g., a PUCCH/a SRS/a PUSCH).

The one RS may include at least one of a DL RS or an UL RS.

The DL RS may include at least one of a QCL Type-D RS corresponding to the lowest CORESET ID or a QCL Type-D RS indicated in a TCI state corresponding to the lowest ID among TCI states for an activated PDSCH.

The UL RS may be a QCL Type-D RS of a DL TCI state (e.g., a SRS). Here, the default PL RS may be configured as a PL RS configured/activated/indicated for the UL RS and the default spatial parameter may be based on a spatial parameter of a corresponding UL RS (or a reference RS for a corresponding UL RS).

As an additional example, the configuration information may include information on at least one of a default spatial parameter or a default PL RS for the uplink transmission related to MTRPs. Based on the configuration information, the default spatial parameter and default PL RS may be (differently) configured per target TRP and/or TO.

Specifically, a default spatial parameter and a default PL RS of a specific uplink channel for each TRP/TO may be determined based on one or more of a specific CORESET in a CORESET group associated/configured for each TRP/TO, or a specific CORESET according to a specific cell among cell(s) configured for each TRP/TO. The configuration information may include information on a CORESET per TRP/TO related to the default spatial parameter/default PL RS. The default spatial parameter/default PL RS related to each TRP/TO may be determined based on a CORESET (or a CORESET group) associated with a corresponding TRP/TO. The associated CORESET (or CORESET group) may be a CORESET (or a CORESET group) related to a specific cell (e.g., a cell with the lowest ID) among serving cell(s) configured for UE. The default spatial parameter/default PL RS related to each TRP/TO may be configured as a QCL Type-D RS corresponding to the associated CORESET (or a QCL Type-D RS corresponding to the lowest CORESET ID in the associated CORESET group).

For example, the configuration information may include information representing enabling/disabling (or, on/off) related to use of the default spatial parameter/default PL RS (e.g., enableDefaultBeamPl for specific uplink transmission).

For example, the above-described operation that UE (100/200 in FIG. 13) in S110 receives configuration information from a BS (e.g., TRP1) (200/100 in FIG. 13) may be implemented by a device in FIG. 13 which will be described after. For example, in reference to FIG. 13, one or more processors 102 may control one or more transceivers 106 and/or one or more memories 104, etc. to receive configuration information from a BS 200 and one or more transceivers 106 may receive configuration information from a BS 200.

UE may receive DCI from a BS (e.g., TRP1/TRP2) S120/S125. The DCI may be based on UL grant DCI or DL grant/allocation DCI. In an example, the DCI may be based on DCI scheduling/triggering transmission of the uplink transmission (e.g., a PUSCH/a SRS). In another example, the DCI may be based on DCI scheduling a PDSCH. In this case, the uplink transmission may be based on a PUCCH (for A/N) for transmission of HARQ-ACK information for the PDSCH. UL/DL Transmission and reception related to the DCI (e.g., a PDSCH, a PUCCH, a SRS, a PUSCH) may be single DCI based UL/DL transmission and reception or multiple DCI based UL/DL transmission and reception.

For the single DCI based operation, UE may receive the DCI from a BS (e.g., TRP1) S120. For the multiple DCI based operation, UE may receive the DCI from a BS (e.g., TRP1 and TRP2), respectively S120 and S125.

For example, the DCI may be transmitted in a specific CORESET configured through the configuration information.

The DCI may include transmission beam information for a plurality of TRPs/TOs (or spatial parameter indication information). For example, the DCI may include a plurality of SRI fields or a plurality of UL-TCI fields. In another example, the DCI may include one SRI field or one UL TCI field associated with the plurality of transmission beam information (or reference RSs). In this case, information on association between an indication value of a SRI/UL-TCI field and the plurality of transmission beam information (e.g., a configuration for codepoint candidate(s)) may be included in the configuration information.

Based on the uplink transmission being a (A/N) PUCCH, the transmission beam information may be based on a PRI field. In this case, a transmission beam for each TRP/TO may be indicated based on one or more of a plurality of spatial parameters (e.g., spatial relation info/UL TCI states/unified TCI states) being configured/mapped to each codepoint based on the PRI field or a plurality of PUCCH resources being configured/mapped to each codepoint based on the PRI field.

For example, the above-described operation that UE (100/200 in FIG. 13) in S120/S125 receives DCI from a BS (200/100 in FIG. 13) may be implemented by a device in FIG. 13 which will be described after. For example, in reference to FIG. 13, one or more processors 102 may control one or more transceivers 106 and/or one or more memories 104, etc. to receive DCI from a BS 200 and one or more transceivers 106 may receive DCI from a BS 200.

UE may perform uplink transmission to a BS (e.g., TRP1/TRP2) S130/S135. The uplink transmission may be transmitted based on the DCI. The uplink transmission may be performed based on at least one of the above-described embodiment 1/2/3 and detailed examples thereof.

In an example, when a spatial parameter and a PL RS for the uplink transmission are not configured and use of the default spatial parameter and default PL RS is enabled (or on) through the configuration information, the uplink transmission may be transmitted based on the default spatial parameter and may be transmitted by transmission power determined based on the default PL RS.

In an example, when a CORESET is not configured in a CC/a BWP related to the uplink transmission or when the uplink transmission is based on a single DCI based MTRP transmission method, the uplink transmission may be performed as follows. Specifically, TCI state(s) may be mapped/connected to codepoints according to a TCI state field included in the (DL grant) DCI. Based on TCI state(s) represented by the lowest codepoint among the codepoints, the default spatial parameter and default PL RS may be configured. The uplink transmission may be transmitted based on the default spatial parameter and may be transmitted by transmission power determined based on the default PL RS.

For example, the above-described operation that UE (100/200 in FIG. 13) in S130/S135 performs uplink transmission to a BS (200/100 in FIG. 13) may be implemented by a device in FIG. 13 which will be described after. For example, in reference to FIG. 13, one or more processors 102 may control one or more transceivers 106 and/or one or more memories 104, etc. to perform uplink transmission to a BS 200 and one or more transceivers 106 may perform uplink transmission to a BS 200.

The above-described operation is described based on UE for convenience of a description, and it is not intended to limit an application scope of the above-described embodiments to an UE operation. Specifically, the above-described embodiments may be applied to a BS operation. In other words, the above-described each step (S110 to S135) may be interpreted/applied as a BS operation. A transmission operation of UE may be interpreted/applied as a reception operation of a BS (e.g., TRP1/TRP2) and a reception operation of UE may be interpreted/applied as a transmission operation of a BS (e.g., TRP1/TRP2).

As described above, the above-described UE operation and/or BS operation (e.g., an operation based on at least one of embodiment 1/2/3 and detailed examples thereof) may be implemented by a device (e.g., a device in FIG. 13) which will be described after. For example, UE may correspond to a transmission device/a first device and a BS may correspond to a reception device/a second device and in some cases, the opposite may be considered. In addition, the above-described UE and/or BS operation (e.g., an operation based on at least one of embodiment 1/2/3 and detailed examples thereof) may be processed by a processor 102/202 in FIG. 13, and an UE and/or BS operation (e.g., an operation based on at least one of embodiment 1/2/3 and detailed examples thereof) may be stored in a memory (e.g., a memory 104/204 in FIG. 13) in a form of a command/a program (e.g., instruction (s), one or more executable code (s)) for driving at least one processor.

General Device to which the Present Disclosure May be Applied

FIG. 13 is a diagram which illustrates a block diagram of a wireless communication system according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
   receiving, by a terminal, first configuration information related to mapping between at least one uplink reference signal (UL RS) and at least one downlink reference signal (DL RS) from a base station;
   receiving, by the terminal, second configuration information related to a plurality of spatial parameter candidates for uplink transmission from the base station; and
   performing, by the terminal, uplink transmission in N transmission occasions (TO) based on at least one of N (N is an integer greater than 1) default uplink spatial parameters or N default pathloss reference signals (PL RS);
   wherein the N default uplink spatial parameters are associated with the N TOs, respectively, and the N default PL RSs are associated with the N TOs, respectively;
   wherein a default uplink spatial parameter for a specific TO among the N TOs is one spatial parameter specified by a predefined rule among the plurality of spatial parameter candidates based on the second configuration information, or an UL RS mapped to the one spatial parameter based on the first configuration information; and wherein based on the plurality of spatial parameter candidates related to the second configuration information being a plurality of UL RSs,
the default uplink spatial parameter for the specific TO is one UL RS specified by the predefined rule among the plurality of UL RSs, and the default PL RS is one DL RS mapped to the one UL RS based on the first configuration information.

2. The method according to claim 1,
wherein based on the plurality of spatial parameter candidates related to the second configuration information being a plurality of DL RS:
the default PL RS and the default uplink spatial parameter for the specific TO are one DL RS specified by the predefined rule among the plurality of DL RSs.

3. The method according to claim 1,
wherein based on the second configuration information being configured for the terminal through one downlink control information (DCI):
the plurality of spatial parameter candidates are indicated by one spatial parameter indication field of the one DCI, or
the plurality of spatial parameter candidates are indicated by a plurality of spatial parameter indication fields of the one DCI.

4. The method according to claim 3,
wherein the predefined rule includes specifying the default uplink spatial parameter, among the plurality of spatial parameter candidates, based on one spatial parameter associated with at least one of:
a spatial parameter indication field having a lowest index,
a codepoint of a lowest index among codepoints preconfigured for the spatial parameter indication field,
a state of a lowest index among states preconfigured for the spatial parameter indication field, or
a resource of a lowest index among resources preconfigured for the spatial parameter indication field.

5. The method according to claim 3, wherein:
the spatial parameter indication field of the one DCI is a SRI (Sounding reference signal Resource Indicator) field, an uplink TCI (Transmission Configuration Indicator) state field, a downlink TCI state field, a PRI (Physical uplink control channel Resource Indicator) field, or an unified TCI state field.

6. The method according to claim 1, wherein:
when a control resource set (CORESET) is not configured in one or more of a CC (Component Carrier), a BWP (BandWidth Part), or a cell in which the uplink transmission is performed, the plurality of spatial parameter candidates are configured based on the second configuration information for at least one of the CC, the BWP, or the cell in which the uplink transmission is scheduled.

7. The method according to claim 1, wherein:
a parameter indicating whether an uplink transmission based on at least one of the default uplink spatial parameter or the default PL RS is enabled is configured by the base station to the terminal.

8. The method according to claim 1,
wherein based on an uplink transmission based on at least one of the default uplink spatial parameter or the default PL RS being disabled:
the uplink transmission is performed, based on N uplink spatial parameters and N PL RSs explicitly indicated through downlink control information (DCI) associated with the uplink transmission.

9. The method according to claim 1, wherein:
an association between the N TOs and at least one of the N default uplink spatial parameters or the N default PL RSs is preconfigured by the base station to the terminal.

10. The method according to claim 1, wherein:
the N TOs are associated with at least one of a plurality of cells, a plurality of repeated transmissions, a plurality of transmission and reception points (TRPs), or a plurality of panels.

11. The method according to claim 1, wherein:
the uplink transmission includes at least one of a Physical Uplink Shared Channel (PUSCH), a Physical Uplink Control Channel (PUCCH), or a Sounding Reference Signal (SRS).

12. The method according to claim 1, wherein:
the default uplink spatial parameter is associated with a beam of the uplink transmission and the default PL RS is associated with a power control of the uplink transmission.

13. A terminal comprising:
at least one transceiver; and
at least one processor connected to the at least one transceiver,
wherein the at least one processor is configured to:
receive first configuration information related to mapping between at least one uplink reference signal (UL RS) and at least one downlink reference signal (DL RS) from a base station through the transceiver;
receive second configuration information related to a plurality of spatial parameter candidates for uplink transmission from the base station through the transceiver; and
perform, through the at least one transceiver, uplink transmission in N transmission occasions (TO) based on at least one of N (N is an integer greater than 1) default uplink spatial parameters or N default pathloss reference signals (PL RS),
wherein the N default uplink spatial parameters are associated with the N TOs respectively, and the N default PL RSs are associated with the N TOs respectively;
wherein a default uplink spatial parameter for a specific TO among the N TOs is one spatial parameter specified by a predefined rule among the plurality of spatial parameter candidates based on the second configuration information, or an UL RS mapped to the one spatial parameter based on the first configuration information; and
wherein based on the plurality of spatial parameter candidates related to the second configuration information being a plurality of UL RSs,
the default uplink spatial parameter for the specific TO is one UL RS specified by the predefined rule among the plurality of UL RSs, and the default PL RS is one DL RS mapped to the one UL RS based on the first configuration information.

14. A base station comprising:
at least one transceivers; and
at least one processors connected to the at least one transceivers,
wherein the at least one processors are configured to:
transmit, to a terminal through the transceiver, first configuration information related to mapping between at least one uplink reference signal (UL RS) and at least one downlink reference signal (DL RS);
transmit, to the terminal through the transceiver, second configuration information related to a plurality of spatial parameter candidates for uplink transmission; and receive uplink transmission transmitted by the terminal through the transceiver in N transmission occasions (TO) based on at least one of N (N is an integer greater than 1) default uplink spatial parameters or N default pathloss reference signals (PL RS), wherein the N default uplink spatial parameters are associated with the N TOs respectively, and the N default PL RSs are associated with the N TOs respectively;

wherein a default uplink spatial parameter for a specific TO among the N TOs is one spatial parameter specified by a predefined rule among the plurality of spatial parameter candidates based on the second configuration information, or an UL RS mapped to the one spatial parameter based on the first configuration information; and wherein based on the plurality of spatial parameter candidates related to the second configuration information being a plurality of UL RSs, the default uplink spatial parameter for the specific TO is one UL RS specified by the predefined rule among the plurality of UL RSs, and the default PL RS is one DL RS mapped to the one UL RS based on the first configuration information.

* * * * *